United States Patent
Itsumi et al.

(10) Patent No.: US 8,363,175 B2
(45) Date of Patent: Jan. 29, 2013

(54) ACTIVE MATRIX SUBSTRATE, LIQUID CRYSTAL PANEL, LIQUID CRYSTAL DISPLAY UNIT, LIQUID CRYSTAL DISPLAY DEVICE, TELEVISION RECEIVER, AND METHOD OF MANUFACTURING LIQUID CRYSTAL PANEL

(75) Inventors: Ikumi Itsumi, Osaka (JP); Toshihide Tsubata, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 725 days.

(21) Appl. No.: 12/532,700

(22) PCT Filed: Feb. 22, 2008

(86) PCT No.: PCT/JP2008/053058
§ 371 (c)(1),
(2), (4) Date: Sep. 23, 2009

(87) PCT Pub. No.: WO2009/001578
PCT Pub. Date: Dec. 31, 2008

(65) Prior Publication Data
US 2010/0109989 A1    May 6, 2010

(30) Foreign Application Priority Data
Jun. 28, 2007    (JP) .................................. 2007-171275

(51) Int. Cl.
*G02F 1/136*    (2006.01)
(52) U.S. Cl. .............................. 349/43; 349/48; 349/139
(58) Field of Classification Search .......................... None
See application file for complete search history.

(56) References Cited

U.S. PATENT DOCUMENTS 4,890,097 A    12/1989    Yamashita et al.
4,902,638 A    2/1990    Muto
(Continued)

FOREIGN PATENT DOCUMENTS

EP    0 458 173 A2    11/1991
JP    63-221325 A    9/1988
(Continued)

OTHER PUBLICATIONS

Office Action mailed Apr. 10, 2012 in U.S. Appl. No. 12/525,764.
(Continued)

*Primary Examiner* — Richard Kim
(74) *Attorney, Agent, or Firm* — Nixon & Vanderhye, P.C.

(57) ABSTRACT

A scanning signal line (16) has an opening (29) in the vicinity of an intersection with a data signal line (15). A first transistor (12*a*) includes two source electrodes (9*ax* and 9*ay*) which sandwich a drain electrode (8*a*); a source electrode (9*ax*) is connected to the data signal line (15) via a source extension electrode (10*ax*) stretched above the opening (29), and a source electrode (9*ay*) is connected to the data signal line (15) via a source extension electrode (10*ay*) provided off the scanning signal line (16). A second transistor (12*b*) includes two source electrodes (9*bx* and 9*by*) that sandwich a drain electrode (8*b*) therebetween. A source electrode (9*bx*) is connected to the data signal line (15) via a source extension electrode (10*bx*), and a source electrode (9*by*) is connected to the data signal line (15) via a source extension electrode (10*by*) off the scanning signal line. According to the configuration, it is possible to repair an SG leak while maintaining function of the transistors operable as much as possible.

17 Claims, 28 Drawing Sheets

U.S. PATENT DOCUMENTS

| | | |
|---|---|---|
| 4,907,861 A | 3/1990 | Muto |
| 5,097,297 A | 3/1992 | Nakazawa |
| 5,303,074 A | 4/1994 | Salisbury |
| 5,897,182 A | 4/1999 | Miyawaki |
| 6,548,831 B1 | 4/2003 | Tokuhiro et al. |
| 7,579,201 B2 | 8/2009 | Kim et al. |
| 7,652,725 B2 * | 1/2010 | Lee et al. .................. 349/38 |
| 8,023,054 B2 | 9/2011 | Cho |
| 2004/0001167 A1 | 1/2004 | Takeuchi |
| 2006/0097972 A1 | 5/2006 | Takeuchi |
| 2009/0021658 A1 | 1/2009 | Takeuchi |
| 2009/0115708 A1 | 5/2009 | Sagawa et al. |
| 2009/0262274 A1 | 10/2009 | Noda et al. |
| 2009/0268119 A1 | 10/2009 | Lee et al. |
| 2010/0109989 A1 | 5/2010 | Itsumi et al. |
| 2010/0245679 A1 | 9/2010 | Shohraku |

FOREIGN PATENT DOCUMENTS

| | | |
|---|---|---|
| JP | 05-232503 | 9/1993 |
| JP | 6-208130 A | 7/1994 |
| JP | 11-119253 | 4/1999 |
| WO | 2006/064789 | 6/2006 |
| WO | 2007/043399 A1 | 4/2007 |

OTHER PUBLICATIONS

Supplementary EP Search Report mailed Apr. 1, 2010 in corresponding EP application 07830721.2.

International Search Report for PCT/JP2008/053058, mailed Apr. 15, 2008.

U.S. Appl. No. 12/525,764, Enda, filed Aug. 4, 2009.

Notice of Allowance mailed Sep. 4, 2012 in U.S. Appl. No. 12/525,764.

* cited by examiner

LASER IRRADIATION

ACTIVE MATRIX SUBSTRATE, LIQUID CRYSTAL PANEL, LIQUID CRYSTAL DISPLAY UNIT, LIQUID CRYSTAL DISPLAY DEVICE, TELEVISION RECEIVER, AND METHOD OF MANUFACTURING LIQUID CRYSTAL PANEL

This application is the U.S. national phase of International Application No. PCT/JP2008/053058, filed 22 Feb. 2008, which designated the U.S. and claims priority to Japanese Patent Application No. 2007-171275, filed 28 Jun. 2007 the entire contents of each of which are hereby incorporated by reference.

TECHNICAL FIELD

The present invention relates to a short-circuit-repairable active matrix substrate and a liquid crystal panel.

BACKGROUND ART

Liquid crystal display devices have outstanding features such as high definition, reduced thickness, a low power consumption and the like, and a market size thereof has been rapidly expanding in recent years. For example, Patent Literature 1 discloses a liquid crystal display device in a pixel segmentation (multi pixel drive) system which includes a plurality of pixel electrodes in one pixel. The liquid crystal display device in the pixel segmentation system is capable of having regions with different luminance in one pixel. As a result, view angle dependency of a γ property (a difference between a γ property at a time when the liquid crystal display device is observed from front and a γ property at a time when the liquid crystal display device is observed from an oblique angle) is improved.

Meanwhile, Patent Literature 2 discloses a configuration of a liquid crystal display device in the pixel segmentation system in which a wiring defect can be repaired. This configuration is illustrated in FIG. 35. As illustrated in FIG. 35, the liquid crystal display device includes an active matrix substrate 700 including scanning signal lines 702 and data signal lines 703 which intersect at right angles with each other. Each pixel of the liquid crystal display device includes a first transistor 707a, a second transistor 707b, a first pixel electrode 705a, a second pixel electrode 705b, a first retention capacity wire 712a, a second retention capacity wire 712b, a first drain lead wire 711a, a second drain lead wire 711b, a first drain drawing electrode 713a, and a second drain drawing electrode 713b. The first transistor 707a includes a source electrode 709a, a drain electrode 710a, and a gate electrode 708a drawn from a scanning signal line 702, and the second transistor 707b includes a source electrode 709b, a drain electrode 710b and a gate electrode 708b drawn from a scanning signal line 702.

The source electrode 709a of the first transistor and the source electrode 709b of the second transistor are connected to a data signal line 703. The drain electrode 710a of the first transistor is connected to the first drain drawing electrode 713a via the first drain lead wire 711a. The drain drawing electrode 713a and the first pixel electrode 705a are connected together via a contact hole. Furthermore, the first drain drawing electrode 713a and a bulge section 714a of the first retention capacity wire 712a form a retention capacitor. Similarly, the drain electrode 710b of the second transistor is connected to the second drain drawing electrode 713b via the second drain lead wire 711b, and this second drain drawing electrode 713b is connected to the second pixel electrode 705b via a contact hole. Furthermore, the second drain drawing electrode 713b and a bulge section 714b of the second retention capacity wire 712b form a retention capacitor.

In this configuration, the first pixel electrode 705a and the second pixel electrode 705b receive the same signal potential. However, by separately controlling potentials of the first retention capacity wire 712a and the second retention capacity wire 712b, the first pixel electrode 705a and the second pixel electrode 705b can have different potentials from each other. This makes it possible to have regions of different luminance in one pixel.

In the active matrix substrate 700, the scanning signal lines 702 have openings 715 between respective gate electrodes 708a of the first transistor and respective gate electrodes 708b of the second transistor. Therefore, for example, if a scanning signal line 702 and a data signal line 703 short-circuit at an intersection 720, thereby causing an SG leak (leak between source and gate), (i) the data signal line 703 is disconnected at a region 722 above a corresponding opening 715 and at a section 723 adjacent to the corresponding first pixel electrode 705a, and (ii) a signal potential is transmitted from an opposite side of the data signal line 703 via an auxiliary wire or the like, so as to repair the SG leak. In this case, the first transistor 707a loses its function as a result of the repair, and the second transistor 707b retains its function. In a case where scanning signal lines 702 and a corresponding source electrode 709a are short-circuited, thereby causing an SG leak, the SG leak is also repaired by (i) disconnecting the respective data signal line 703 at the foregoing two positions and (ii) transmitting a signal potential from an opposite side of the data signal line 703 via an auxiliary wire or the like.

CITATION LIST

Patent Literature 1
Japanese Patent Application Publication, Tokukai, No. 2004-78157 A (Publication Date: Mar. 11, 2004)
Patent Literature 2
International Patent Application Publication, No. WO2006/064789 A (Publication Date: Jun. 22, 2006)

SUMMARY OF INVENTION

However, in this liquid crystal display device, repair of the SG leak cannot be carried out without causing one of the transistors to lose its function. That is to say, even in a case where the SG leak is caused by a short-circuit between a source electrode and a scanning signal line, repair can only be carried out at the sacrifice of the function of one of the transistors. Moreover, use of an auxiliary wire or the like is essential for the repair. The use of the auxiliary wire or the like have such demerits that extra work is necessary to connect the auxiliary wire, and the use of the auxiliary wire adds an electric load. These demerits are remarkable particularly with large-sized liquid crystal display devices.

The present invention is accomplished in view of the above problems, and an object thereof is to make it possible to repair an SG leak while maintaining functions of transistors operable as much as possible, in an active matrix substrate in a pixel segmentation system having a plurality of transistors in one pixel region and in a liquid crystal display device including the active matrix substrate.

An active matrix substrate of the present invention includes: scanning signal lines extending in a row direction (for example, extending in a row direction so as to cross respective pixel regions); data signal lines extending in a column direction (for example, extending in a column direction along respective pixel regions); first transistors and second transistors, each pair of which is provided in a vicinity of corresponding intersections of the scanning signal lines and the data signal lines respectively, the first transistors and the second transistors being connected to the data signal lines corresponding thereto and having gate electrodes which are the scanning signal lines corresponding thereto; and pixel regions, each of the pixel regions including: a first pixel electrode connected to corresponding one of the first transistors; and a second pixel electrode connected to corresponding one of the second transistors, the scanning signal lines each having an opening, a first scanning electrode section, and a second scanning electrode section in the vicinity of each intersection, the first scanning electrode section and a second scanning electrode section being provided on respective adjacent sides to the opening in such a manner that the first scanning electrode section and second scanning electrode section face each other and sandwich therebetween the opening in a column direction, each of the first transistors including (i) a drain electrode provided above the first scanning electrode section corresponding thereto and (ii) two source electrodes provided such that the drain electrode is sandwiched between the two source electrodes, one of the source electrodes being connected to the data signal line corresponding thereto, via a source extension electrode (first inside source extension electrode) provided above the opening corresponding thereto, and the other one of source electrodes being connected to the data signal line corresponding thereto, via a source extension electrode (first outside source extension electrode) provided off the scanning signal line corresponding thereto, and each of the second transistors including (i) a drain electrode provided above the second scanning electrode section corresponding thereto and (ii) two source electrodes provided such that the drain electrode is sandwiched between the two source electrodes, one of the source electrodes being connected to the data signal line corresponding thereto, via a source extension electrode (second inside source extension electrode) provided above the opening corresponding thereto, and the other one of the source electrodes being connected to the data signal line corresponding thereto, via a source extension electrode (second outside source extension electrode) provided off the scanning signal line corresponding thereto.

In the present active matrix substrate, the source extension electrodes that are connected to respective source electrodes do not overlap the scanning signal lines (first and second scanning electrode sections). Therefore, it is possible to disconnect the source extension electrodes. Moreover, each of the first transistors has two source electrodes. Therefore, even if one of the source electrodes loses its function as a result of the repair, the first transistor itself is operable. Similarly, each of the second transistors also has two source electrodes. Hence, even if one of the source electrodes loses its function as a result of the repair, the second transistor itself is operable.

Accordingly, in a case where a defect caused by short-circuit between (i) a data signal line or a source electrode connected to the data signal line and (ii) a scanning signal line is detected in a pixel region in a vicinity of an intersection of the corresponding data signal line and scanning signal line, an SG leak (leak between source and gate) is repairable while maintaining operation of the transistors as much as possible, by carrying out a repair step including at least one of the following steps: (a) disconnecting any one of first and second outside source extension electrodes and first and second inside source extension electrodes; (b) disconnecting a data signal line between (i) a section connecting the data signal line and a first outside source extension electrode and (ii) an intersection of the data signal line and a first scanning electrode section; (c) disconnecting a data signal line between (i) a section connecting the data signal line and an first inside source extension electrode and (ii) an intersection of the data signal line and a first scanning electrode section; (d) disconnecting a data signal line between (i) a section connecting a data signal line and a second outside source extension electrode and (ii) an intersection of the data signal line and a second scanning electrode section; (e) disconnecting a data signal line between (i) a section connecting the data signal line and a second inside source extension electrode and (ii) an intersection of the data signal line and a second scanning electrode section; (f) disconnecting a first scanning electrode section of the scanning signal line at a section below a gap between a first outside source extension electrode and a first inside source extension electrode; and (g) disconnecting a second scanning electrode section of the scanning signal line at a section below a gap between a second inside source extension electrode and a second outside source extension electrode.

Another active matrix substrate of the present invention includes: scanning signal lines extending in a row direction (for example, extending in a row direction so as to cross respective pixel regions); data signal lines extending in a column direction (for example, extending in a column direction along respective pixel regions); first transistors and second transistors, each pair of which is provided in a vicinity of corresponding intersections of the scanning signal lines and the data signal lines respectively, the first transistors and the second transistors being connected to the data signal lines corresponding thereto and having gate electrodes which are the scanning signal lines corresponding thereto; and pixel regions, each of the pixel regions including: a first pixel electrode connected to corresponding one of the first transistors; and a second pixel electrode connected to corresponding one of the second transistors, the scanning signal lines each having an opening, a first scanning electrode section, and a second scanning electrode section in the vicinity of each intersection, the first scanning electrode section and the scanning electrode section being provided on respective adjacent sides to the opening in such a manner that the first scanning electrode section and the second scanning electrode section face each other and sandwich therebetween the opening in a column direction, each pair of the first and second transistors having a common source electrode, the common source electrode being provided so as to overlap (i) the first and second scanning electrode sections corresponding thereto and (ii) the opening corresponding thereto, the common source electrode being connected to the data signal line corresponding thereto via a source extension electrode (common source extension electrode) provided above the opening corresponding thereto, each of the first transistors including (i) a drain electrode provided above the first scanning electrode section corresponding thereto and (ii) a source electrode provided such that the drain electrode is sandwiched between the common source electrode and the source electrode, the source electrode being connected to the data signal line corresponding thereto via a source extension electrode (first outside source extension electrode) provided off the scanning signal line corresponding thereto, each of the second transistors including (i) a drain electrode provided above the second scanning electrode section corresponding thereto and (ii) a source electrode provided such that the drain electrode is sandwiched between the common source electrode and the source electrode, the source electrode being connected to the data signal line corresponding thereto via a source extension electrode (second outside source extension electrode) provided off the scanning signal line corresponding thereto.

In this configuration, the source extension electrodes connected to respective source electrodes do not overlap with the scanning signal lines (first and second scanning electrode sections). Therefore, it is possible to disconnect the source extension electrodes. Moreover, each of the first transistors has two source electrodes (one is the common source electrode). Therefore, even if one of the source electrodes loses its function as a result of the repair, the first transistor itself is operable. Similarly, the second transistor also has two source electrodes (one is the common source electrode). Therefore, even if one of the source electrodes loses its function as a result of the repair, the second transistor itself is operable.

Accordingly, in a case where a defect caused by a short-circuit between (i) a data signal line or a source electrode connected to the data signal line and (ii) a scanning signal line is detected in a pixel region in a vicinity of an intersection of the corresponding data signal lines and the scanning signal lines, the SG leak is repairable while maintaining functions of the transistors operable as much as possible, by carrying out a repair step including at least one of the following steps: (a) disconnecting any one of a common source extension electrode and first and second outside source extension electrodes; (b) disconnecting the data signal line between (i) a section connecting the data signal line and a first outside source extension electrode and (ii) an intersection of the data signal line and a first scanning electrode section; (c) disconnecting the data signal line between (i) a section connecting the data signal line and a common source extension electrode and (ii) an intersection of a data signal line and a first scanning electrode section; (d) disconnecting a data signal line between (i) a section connecting the data signal line and a common source extension electrode and (ii) an intersection of the data signal line and the second scanning electrode section; (e) disconnecting a data signal line between (i) a section connecting the data signal line and a second outside source extension electrode and (ii) an intersection of the data signal line and a second scanning electrode section; (f) disconnecting a first scanning electrode section of the scanning signal line at a section below a gap between a first outside source extension electrode and a common source extension electrode; and (g) disconnecting a second scanning electrode section of the scanning signal line at a section below a gap between a second outside source extension electrode and a common source extension electrode.

The present active matrix substrate may be arranged such that the first scanning electrode section has a narrowed portion at least a part of a portion located below a gap between (i) the source extension electrode connected to one of the two source electrodes of the first transistor and (ii) the source extension electrode connected to the other source electrode of the first transistor, the narrowed portion being narrowed in width, and the second scanning electrode section has a narrowed portion at least a part of a portion located below a gap between (i) the source extension electrode connected to one of the two source electrodes of the second transistor and (ii) the source extension electrode connected to the other source electrode of the second transistor, the narrowed portion being narrowed, in width. By locally providing a long distance between the source extension electrode and the scanning electrode section for carrying out disconnection of the source extension electrode at that part, the disconnection step is facilitated. Furthermore, this narrowed portion may also be used for disconnecting the scanning signal line. For example, in a case where short-circuit is occurred below a data signal line, it is possible to separate a short-circuited scanning electrode section from a corresponding whole scanning signal line, by carrying out disconnection at a corresponding narrowed portion and at a part on an opposite side of the data signal line with respect to the narrowed portion.

The present active matrix substrate may be arranged such that the first scanning electrode section has a narrowed portion at least a part of a portion located below a gap between (i) the source extension electrode connected to the source electrode of the first transistor and (ii) the source extension electrode connected to the common source electrode, the narrowed portion being narrowed in width, and the second scanning electrode section has a narrowed portion at least a part of a portion located below a gap between (i) the source extension electrode connected to the source electrode of the second transistor and (ii) the source extension electrode connected to the common source electrode. By locally providing a long distance between the source extension electrode and the scanning electrode section for carrying out disconnection of the source extension electrode at that part, the disconnection step is facilitated. Furthermore, this narrowed portion may also be used for disconnecting the scanning signal lines. For example, in a case where a short-circuit is occurred below a data signal line, it is possible to separate a short-circuited scanning electrode section from a corresponding whole scanning signal line, by carrying out disconnection at this narrowed portion and at a part on an opposite side of the data signal line with respect to the narrowed portion.

The present active matrix substrate may be configured such that the source extension electrodes have a width in its row direction greater than that in its column direction. Thus, by providing a narrowed source extension electrode, the disconnection is facilitated.

The present active matrix substrate is configured such that each of the openings extends from outside the pixel region corresponding thereto, to inside the pixel region, each of the openings extending so as to cross under the respective data signal line. Such a configuration allows separation of a short-circuited section of a scanning electrode section from the corresponding whole scanning signal line, in a case where a short-circuit is occurred between the scanning electrode section and the data signal line. In this case, it is preferable for the first scanning electrode section to have two ends in a row direction, one end of the first scanning electrode section provided outside the respective pixel region being a first end, the first end having a slit, and the second scanning electrode section to have two ends in a row direction, one end of the second scanning electrode section provided outside the respective pixel region being a second end, the second end having a slit. As a result, the disconnection at the scanning electrode section is facilitated.

The present active matrix substrate may be configured such that the openings are shaped to extend in a row direction.

The present active matrix substrate may be configured such that subwires are provided so as to extend along the data signal lines, the subwires being electrically connected to the data signal lines respectively and passing over the openings corresponding thereto. This configuration does not require connection of an auxiliary wire even in a case where a data signal line is disconnected in the repair step. The subwires stretch over the respective openings; this reduces a possibility of a short-circuit between the subwires and the respective scanning signal lines, and also reduces parasitic capacity that generates between the subwires and the respective scanning signal lines. In this case, it is preferable for the subwires to be connected to the respective data signal lines above the openings corresponding thereto.

The present active matrix substrate may be configured such that bypass wires are provided to the respective data signal lines in such a manner that each of the bypass wires bypasses an intersection of the data signal line corresponding thereto and passes over the openings corresponding thereto. This configuration does not require connection of an auxiliary wire even in a case where a data signal line is disconnected in the repair step. The subwires stretch over the respective openings; this reduces a possibility of a short-circuit between the subwires and the respective scanning signal lines, and also reduces parasitic capacity that generates between the subwires and the respective scanning signal lines. In this case, it is preferable for the bypass wires and the respective data signal lines to be connected above the openings corresponding thereto.

In the present active matrix substrate, it is preferable that an inorganic interlayer insulating film and an organic interlayer insulating film are provided above the first transistors and the second transistors, the organic interlayer insulating film being thicker than the inorganic interlayer insulating film. This configuration compensates a rolling up of a metal crack at the thick interlayer insulating film, for example when a source extension section or a scanning electrode section is disconnected by laser irradiation from a rear side of the active matrix substrate.

The present active matrix substrate may be configured such that an inorganic gate insulating film and a gate insulating film (for example, an organic gate insulating film) thicker than the inorganic gate insulating film are provided above the narrowed portion of the first scanning electrode section and above the narrowed portion of the second scanning electrode section. This configuration compensates a rolling up of metal by providing the thick gate insulating film, when the first or second scanning electrode section is disconnected at a corresponding narrowed portion.

The present liquid crystal panel includes the foregoing active matrix substrate.

In the present liquid crystal panel, a black matrix, provided to a substrate that faces the active matrix substrate, overlaps the openings.

The present liquid crystal display unit includes the liquid crystal panel and a driver of the liquid crystal panel.

The present liquid crystal display device includes the liquid crystal display unit and an illumination device.

The present television receiver includes the liquid crystal display device and a tuner for receiving television broadcast.

A method of the present invention for manufacturing a liquid crystal panel, which liquid crystal panel includes an active matrix substrate including: scanning signal lines extending in a row direction (for example, extending in a row direction so as to cross respective pixel regions); data signal lines extending in a column direction (for example, extending in a column direction along respective pixel regions); first transistors and second transistors, each pair of which is provided in a vicinity of corresponding intersections of the scanning signal lines and the data signal lines respectively, the first transistors and the second transistors being connected to the data signal lines corresponding thereto and having gate electrodes which are the scanning signal lines corresponding thereto; and pixel regions, each of the pixel regions including: a first pixel electrode connected to corresponding one of the first transistors; and a second pixel electrode connected to corresponding one of the second transistors, is a method including the steps of: (A) forming the scanning signal lines so that the scanning signal lines each have an opening, a first scanning electrode section, and a second scanning electrode section in the vicinity of each intersection, the first scanning electrode section and a second scanning electrode section being provided on respective adjacent sides to the opening in such a manner that the first scanning electrode section and second scanning electrode section face each other and sandwich therebetween the opening in a column direction; (B) forming the first transistors and the second transistors, so that the first transistors include (i) a drain electrode provided above the first scanning electrode section corresponding thereto, (ii) two source electrodes provided such that the drain electrode is sandwiched between the two source electrodes, (iii) a first inside source extension electrode provided above the opening corresponding thereto, for connecting one of the source electrodes to the data signal line corresponding thereto, and (iv) a first outside source extension electrode provided off the scanning signal line corresponding thereto, for connecting the other source electrode to the data signal line corresponding thereto, and, so that the second transistors include (v) a drain electrode provided above the second scanning electrode section corresponding thereto, (vi) two source electrodes provided such that the drain electrode is sandwiched between the two source electrodes, (vii) a second inside source extension electrode provided above the opening corresponding thereto, for connecting one of the source electrodes to the data signal line corresponding thereto, and (viii) a second outside source extension electrode provided off the scanning signal line corresponding thereto, for connecting the other source electrode to the data signal line corresponding thereto; and (C) repairing, the step (C) including at least one of the steps of: (a) disconnecting any one of first and second outside source extension electrodes and first and second inside source extension electrodes, (b) disconnecting a data signal line between (i) a section connecting the data signal line and a first outside source extension electrode and (ii) an intersection of the data signal line and a first scanning electrode section; (c) disconnecting a data signal line between (i) a section connecting the data signal line and an first inside source extension electrode and (ii) an intersection of the data signal line and a first scanning electrode section; (d) disconnecting a data signal line between (i) a section connecting a data signal line and a second outside source extension electrode and (ii) an intersection of the data signal line and a second scanning electrode section; (e) disconnecting a data signal line between (i) a section connecting the data signal line and a second inside source extension electrode and (ii) an intersection of the data signal line and a second scanning electrode section; (f) disconnecting a first scanning electrode section at a section below a gap between a first outside source extension electrode and a first inside source extension electrode; and (g) disconnecting a second scanning electrode section at a section below a gap between a second inside source extension electrode and a second outside source extension electrode.

In the method of the present invention for manufacturing a liquid crystal panel, the step (C) may include: (h) detecting a defect caused by a short-circuit between a data signal line or a source electrode connected to this data signal line and a scanning signal line; (i) determining whether the short-circuit is in a first scanning electrode section or in a second scanning electrode section of this scanning signal line by disconnecting this data signal line at a part connected to a first inside source extension electrode of a pixel region positioned in the vicinity of an intersection of this data signal line and this scanning signal line; in a case where the step (i) determines that the short-circuit is occurred in this first scanning electrode section, (j) disconnecting this first scanning electrode section at an end of this first scanning electrode section in a row direction, the end being provided outside the respective pixel region, and disconnecting at a part below a gap between this first outside source extension electrode and this first inside source extension electrode; and (k) disconnecting this first outside source extension electrode or this first inside source extension electrode in a case where the defect still does not resolve even after the step (j); in a case where the step (i) determines that the short-circuit is occurred in the second scanning electrode section, (l) disconnecting this second scanning electrode section at an end of the second scanning electrode in the row direction, the end being provided outside the respective pixel region; (m) disconnecting a part below a gap between the second outside source extension electrode and the second inside source extension electrode; and (n) disconnecting the second outside source extension electrode or the second inside source extension electrode in a case where the defect still does not resolve even after the step (m).

A method of the present invention for manufacturing a liquid crystal panel, which liquid crystal panel includes an active matrix substrate including: scanning signal lines extending in a row direction (for example, extending in a row direction so as to cross respective pixel regions); data signal lines extending in a column direction (for example, extending in a column direction along respective pixel regions); first transistors and second transistors, each pair of which is provided in a vicinity of corresponding intersections of the scanning signal lines and the data signal lines respectively, the first transistors and the second transistors being connected to the data signal lines corresponding thereto and having gate electrodes which are the scanning signal lines corresponding thereto; and pixel regions, each of the pixel regions including: a first pixel electrode connected to corresponding one of the first transistors; and a second pixel electrode connected to corresponding one of the second transistors, is a method including the steps of: (A) forming the scanning signal lines so that the scanning signal lines each have an opening, a first scanning electrode section, and a second scanning electrode section provided on respective adjacent sides to the opening in such a manner that the first scanning electrode section and the second scanning electrode section face each other and sandwich therebetween the opening in a column direction; (B) forming (i) a common source electrode operating as a common source electrode of the first and second transistors, the common source electrode provided so as to overlap the first and second scanning electrode sections corresponding thereto and the opening corresponding thereto, (ii) a common source extension electrode provided above the opening corresponding thereto, for connecting the common source electrode and the data signal line corresponding thereto, (iii) a drain electrode of the first transistor provided above the first scanning electrode section corresponding thereto, (iv) a source electrode of the first transistor provided such that the drain electrode is sandwiched between the source electrode of the first transistor and the common source electrode, (v) the first outside source extension electrode provided off the scanning signal line corresponding thereto, for connecting the source electrode of the first transistor and the data signal line corresponding thereto, (vi) a drain electrode of the second transistor provided above the second scanning electrode section corresponding thereto, (vii) a source electrode of the second transistor provided such that the drain electrode of the second transistor is sandwiched between the source electrode of the second transistor and the common source electrode, and (viii) a second outside source extension electrode provided off the scanning signal line corresponding thereto, for connecting the source electrode of the second transistor and the data signal line corresponding thereto; and (C) repairing, the step (C) including at least one of the steps of: (a) disconnecting any one of a common source extension electrode and first and second outside source extension electrodes; (b) disconnecting the data signal line between (i) a section connecting the data signal line and a first outside source extension electrode and (ii) an intersection of the data signal line and a first scanning electrode section; (c) disconnecting the data signal line between (i) a section connecting the data signal line and a common source extension electrode and (ii) an intersection of a data signal line and a first scanning electrode section; (d) disconnecting a data signal line between (i) a section connecting the data signal line and a common source extension electrode and (ii) an intersection of the data signal line and the second scanning electrode section; (e) disconnecting a data signal line between (i) a section connecting the data signal line and a second outside source extension electrode and (ii) an intersection of the data signal line and a second scanning electrode section; (f) disconnecting a first scanning electrode section at a section below a gap between a first outside source extension electrode and a common source extension electrode; and (g) disconnecting a second scanning electrode section at a section below a gap between a second outside source extension electrode and a common source extension electrode.

As described above, according to the present invention, it is possible in an active matrix substrate in a pixel segmentation system to repair an SG leak while maintaining operation of each of the transistors as much as possible.

BRIEF DESCRIPTION OF DRAWINGS

FIG. 28 (b) is a schematic view showing a configuration of a liquid crystal display device of the present invention.

Figure 1:
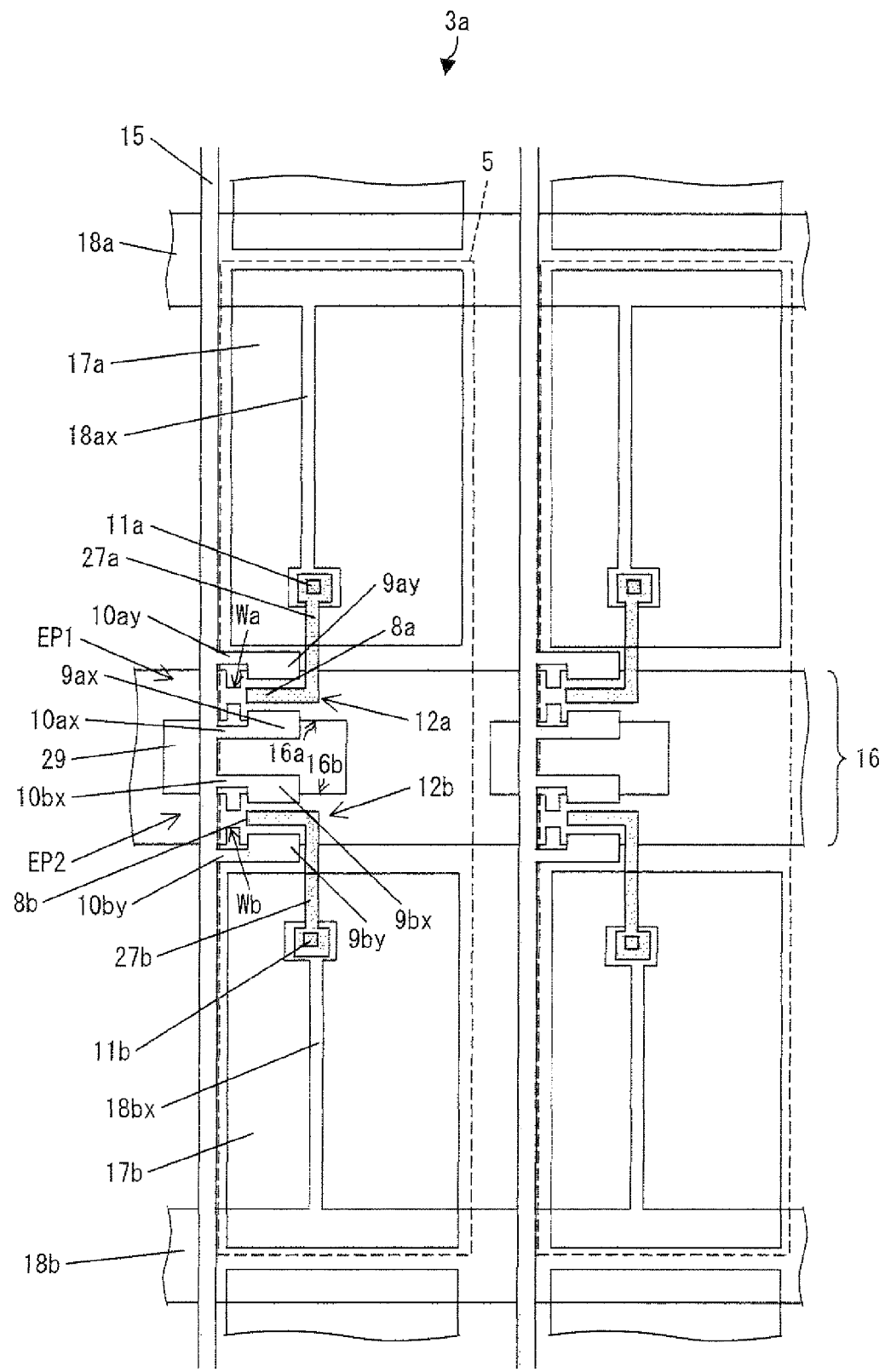
FIG. 1 is a plan view showing a configuration of an active matrix substrate according to First Embodiment.

REFERENCE SIGNS LIST 3a-3d-3x Active matrix substrate
5 Pixel region
8a•8b Drain electrode
9ax•9ay Source electrode
9bx•9by Source electrode
9z Common source electrode
10ax•10ay Source extension electrode
10bx•10 by Source extension electrode
12a First transistor
12b Second transistor
15 Data signal line
16 Scanning signal line
16a First scanning electrode section
16b Second scanning electrode section
17a First pixel electrode
17b Second pixel electrode
18a First retention capacitor wire
18b Second retention capacitor wire
18ax First retention capacitor wire extension section
18bx Second retention capacitor wire extension section
23 Gate insulating film
25 Interlayer insulating film
29 Opening
35 Color filter substrate
100 Liquid crystal display unit
110 Liquid crystal display device
601 Television receiver
EP1•EP2 First and second ends
Wa•Wb Narrowed portion (of a scanning electrode section)

DESCRIPTION OF EMBODIMENTS

Examples of embodiments of the present invention are described below with reference to FIGS. 1 through 34.

First Embodiment

FIG. 1 is a (perspective) plan view showing a part of an active matrix substrate according to First Embodiment of the present invention. As shown in FIG. 1, an active matrix substrate 3a includes data signal lines 15 and scanning signal lines 16 which intersect at right angles to each other, first and second retention capacitor wires 18a and 18b, and pixel regions 5 provided in a matrix pattern. The data signal lines 15 are provided above the scanning signal lines 16. Each scanning signal line 16 extends in a row direction (horizontal direction in FIG. 1) so as to cross corresponding pixel regions 5. Each data signal line 15 extends in a column direction (vertical direction in FIG. 1) along corresponding pixel regions. Each of the first retention capacitor wires 18a and the second retention capacitor wires 18b extends in the row direction (horizontal direction in the drawing) so as to overlap adjacent end portions of respective two pixel regions adjacent in the column direction.

Each pixel region 5 includes a first transistor 12a, a second transistor 12b, a first pixel electrode 17a, a second pixel electrode 17b, a part of the first retention capacitor wire 18a, a part of the second retention capacitor wire 18b, a first drain lead wire 27a, a second drain lead wire 27b, a first contact hole 11a, and a second contact hole 11b.

Each scanning signal line 16 which crosses a center portion of the respective pixel regions 5 has rectangular openings 29. Each rectangular opening is extended from outside a respective pixel region to inside that pixel region by crossing under a respective data signal line 15. Each scanning signal line 16 has first scanning electrode sections 16a and second scanning electrode sections 16b, which are respectively portions located on either sides of the openings 29, that is, portions which face each other in the column direction via the corresponding opening 29. A part of the first scanning electrode 16a serves as a gate electrode of the first transistor 12a, and a part of the second scanning electrode section 16b serves as a gate electrode of the second transistor 12b. Furthermore, the first scanning electrode 16a has two ends in the row direction, and one end which is provided off the respective pixel region is referred to as EP1. Further, the second scanning electrode 16b has two ends in the row direction, and one end which is provided off the respective pixel region is referred to as EP2.

Figure 2:
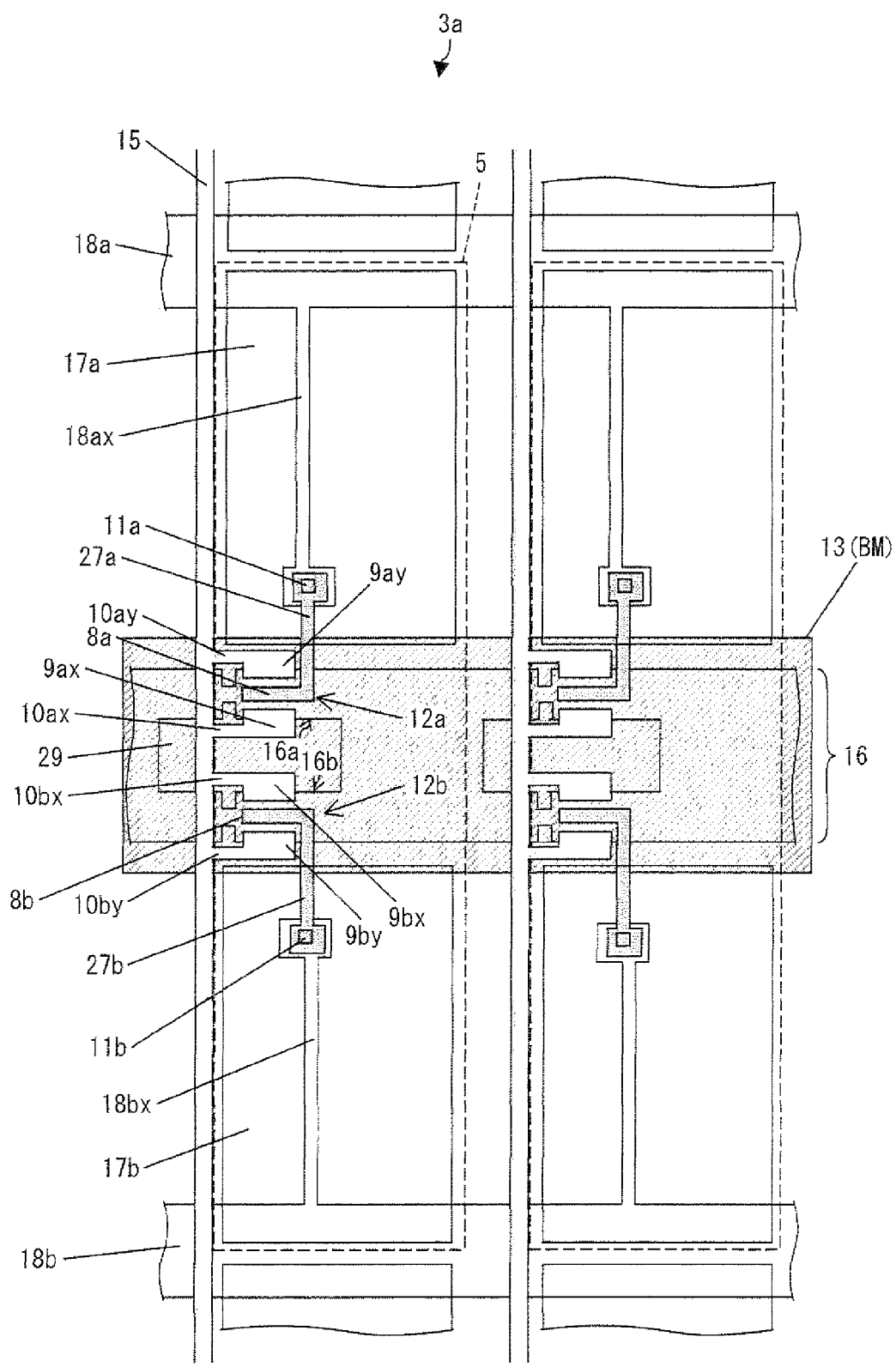
FIG. 2 is a plan view showing a configuration of a liquid crystal panel including the active matrix substrate of FIG. 1.

The first pixel electrode 17a is one provided on one side (upper side in FIG. 1) of the scanning signal line 16, and the second pixel electrode 17b is one provided on the other side (lower side in FIG. 1) of the scanning signal line 16. In a case where the present active matrix substrate 3a is adopted to a liquid crystal panel, a first pixel capacitor is formed by (i) the first pixel electrode 17a, (ii) a counter electrode (common electrode) formed on a color filter substrate, and (iii) a liquid crystal material provided between the two electrodes; and a second pixel capacitor is formed by (i) the second pixel electrode 17b, (ii) the counter electrode, and (iii) the liquid crystal material between the two electrodes. Moreover, in the case where the present active matrix substrate 3a is adopted to a liquid crystal panel, a black matrix BM is superposed on the openings 29 of the scanning signal line 16, as shown in FIG. 2. Therefore, there is no fear of leak of light or the like.

Here, the first transistor 12a includes a drain electrode 8a provided above the first scanning electrode section 16a and two source electrodes 9ax and 9ay provided on either side of the drain electrode 8a in the column direction. The source electrode 9ax is connected to the respective data signal line 15 via a source extension electrode 10ax (a first inside source extension electrode) formed above the opening 29. The source electrode 9ay is connected to the data signal line 15 via a source extension electrode 10ay (a first outside source extension electrode) provided (off the scanning signal line 16) in such a manner that the source extension electrode 10ay sandwiches the first scanning electrode section 16a with the source extension electrode 10ax. On the other hand, the second transistor 12b includes a drain electrode 8b provided above the second scanning electrode section 16b and two source electrodes 9bx and 9by provided on either side of the drain electrode 8b in the column direction. The source electrode 9bx is connected to the data signal line 15 via a source extending electrode 10bx (a second inside source extension electrode) provided above the opening 29. The source electrode 9by is connected to the data signal line 15 via a source extending electrode 10by (a second outside source extension electrode) provided (off an outside region of the scanning signal line 16) in such a manner that the source extending electrode 10by sandwiches the second scanning electrode section 16b with the source extension electrode 10bx.

The first scanning electrode section 16a has a narrowed portion Wa in at least a part of a section sandwiched between the source extending electrodes 10ax and 10ay in plan view. On the other hand, the second scanning electrode section 16b has a narrowed portion Wb in at least a part of a section sandwiched between the source extending electrodes 10bx and 10by in plan view. The narrowed portion Wa facilitates disconnection of the source extension electrodes 10ax or 10ay in order to repair the SG leak (later described), and the narrowed portion Wb facilitates disconnection of the source extension electrodes 10bx or 10by, in order to repair the SG leak. By providing the narrowed portion Wa, the source extension electrode 10ay provided off the scanning signal line 16 can be disconnected even though the source extension electrode 10ay is positioned in proximity to the scanning signal line 16 (first scanning electrode section 16a). With this, an aperture ratio is improved. Similarly, by providing the narrowed portion Wb, the source extending electrode 10by provided off the scanning signal line 16 can be disconnected even though the source extension electrode 10by is positioned in proximity to the scanning signal line 16 (second scanning electrode section 16b). With this, the aperture ratio is improved.

The drain electrode 8a of the first transistor is connected to the first pixel electrode 17a via the first drain lead wire 27a and the contact hole 11a. Moreover, a first retention capacitor is formed at where the first pixel electrode 17a and the first retention capacitor wire 18a are superposed with each other. Similarly, the drain electrode 8b of the second transistor is connected to the second pixel electrode 17b via the second drain lead wire 27b and the contact hole 11b. Moreover, a second retention capacitor is formed at where the second pixel electrode 17b and the second retention capacitor wire 18b are superposed with each other. Furthermore, a first retention capacitor wire extension section 18ax is extended from the first retention capacitor wire 18a, so as to have one end thereof superposed with an end section of the drain lead wire 27a. On the other hand, a second retention capacitor wire extension section 18bx is extended from the first retention capacitor wire 18b, so as to have one end thereof superposed with an end section of the drain lead wire 27b.

With the aforementioned configuration, the same signal potential is supplied from the data signal line 15 to the first pixel electrode 17a and the second pixel electrode 17b. However, by separately controlling potentials of the first retention capacitor wire 18a and the second retention capacitor wire 18b, the first pixel electrode 17a and the second pixel electrode 17b may have different potentials via the first and second retention capacitors. That is, in a liquid crystal display device including the present active matrix substrate 3a, halftone by area coverage modulation can be displayed by forming different luminance regions in one pixel. This alleviates excess brightness on a screen.

Figure 3:
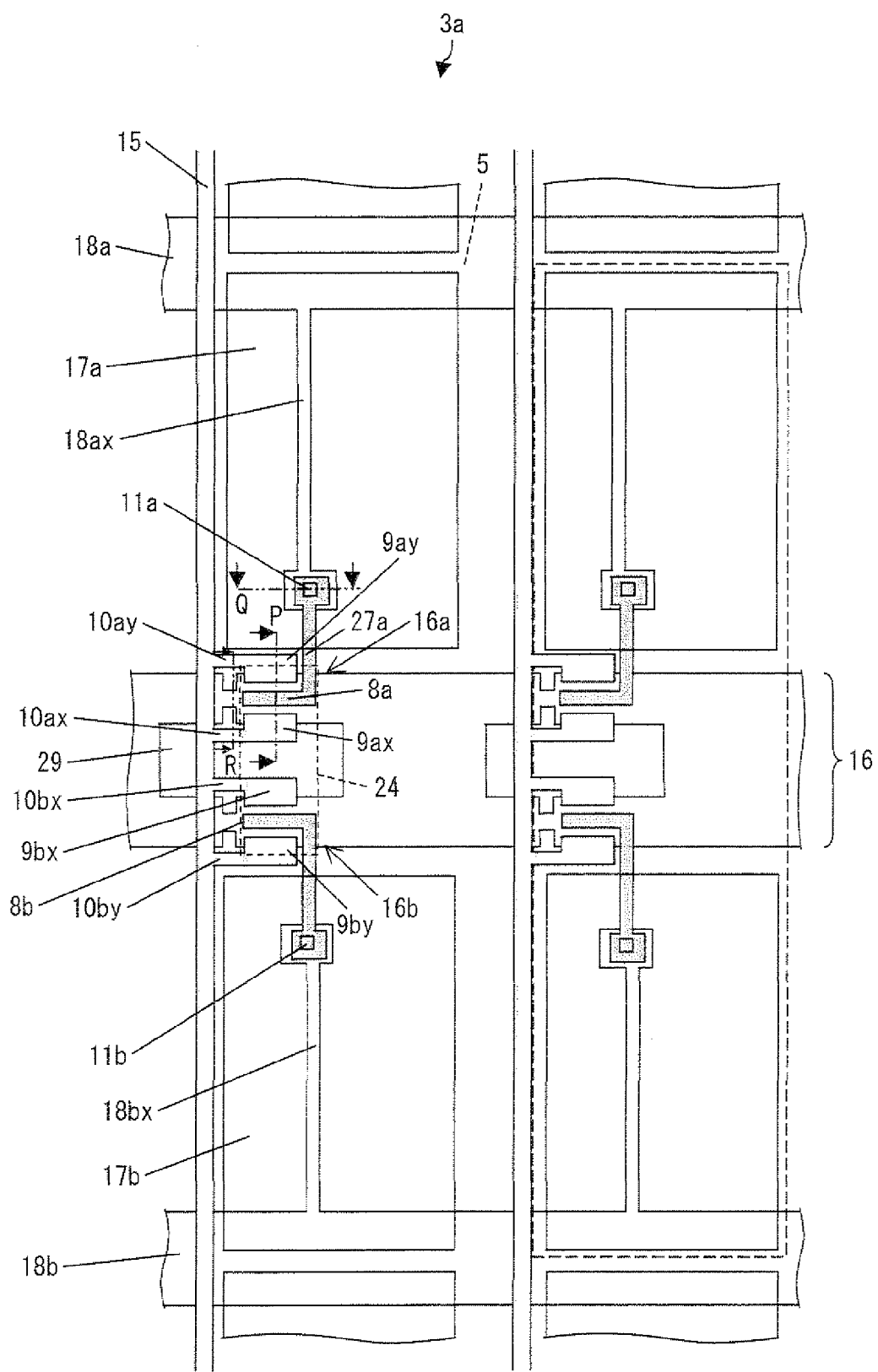
FIG. 3 is a plan view showing a position of a semiconductor layer in the active matrix substrate of FIG. 1.
Figure 4:
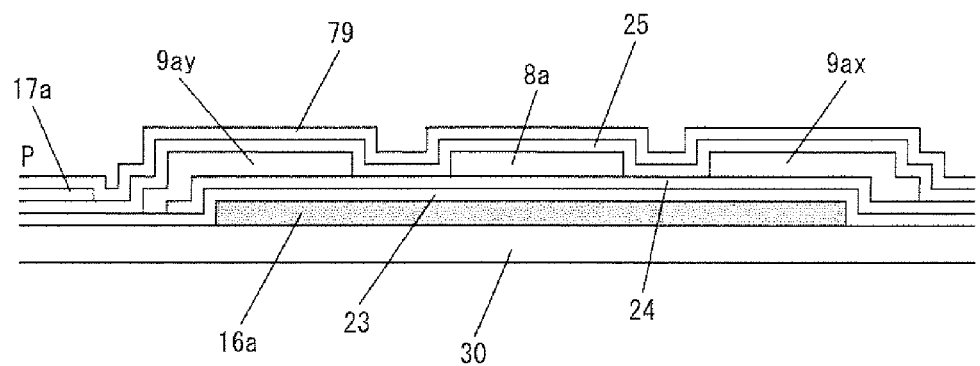
FIG. 4 is a cross sectional view taken on Broken line P shown in FIG. 3.

FIG. 3 shows where a semiconductor layer is located in FIG. 1. FIG. 4 is a cross sectional view taken on Broken line P in FIG. 3. As shown in FIGS. 3 and 4, the present active matrix substrate 3a is configured such that the first scanning electrode section 16a (scanning signal line 16) is provided on a substrate 30, and on the first scanning electrode section 16a, a gate insulating film 23 is provided. On the gate insulating film 23, the two source electrodes 9ax and 9ay and the drain electrode 8a sandwiched therebetween are provided with a semiconductor layer 24 between the gate insulating film 23 and these electrodes. On the source electrodes 9ax and 9ay and the drain electrode 8a, an interlayer insulating film (inorganic interlayer insulating film) 25 is provided, and on the interlayer insulating film 25, the first pixel electrode 17a is provided. Further, the first pixel electrode 17a is covered with an alignment film 79.

Figure 5:
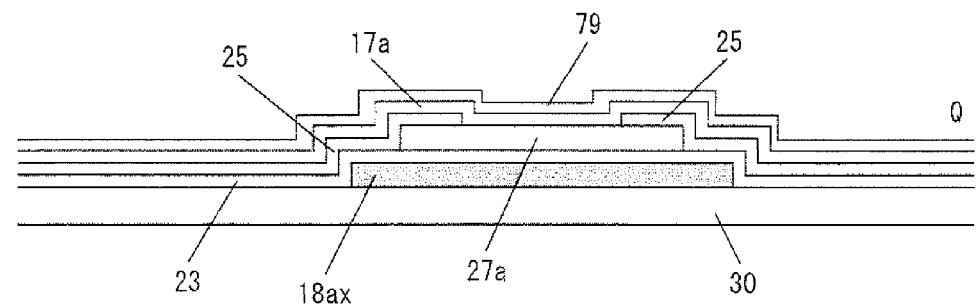
FIG. 5 is a cross sectional view taken on Broken line Q shown in FIG. 3.

FIG. 5 is a cross sectional view taken on Broken line Q in FIG. 3. As shown in FIGS. 3 and 5, the present active matrix substrate 3a is configured such that the retention capacitor extension section 18ax extended from the retention capacitor wire 18a is provided on the substrate 30, and on the retention capacitor extension section 18ax, the gate insulating film 23 is provided. On the gate insulating film 23, the drain lead wire 27a is provided. Here, the end section of the drain lead wire 27a is superposed on the end section of the first retention capacitor wire extension section 18ax. Moreover, on the drain drawing wire 27a, the interlayer insulating film (inorganic interlayer insulating film) 25 is provided, and on the interlayer insulating film 25, the first pixel electrode 17a is provided. The first pixel electrode 17a is covered with the alignment film 79. The contact hole 11a superposes on the superposed section of the first retention capacitor wire extension section 18ax and the drain lead wire 27a. The interlayer insulating film 25 is removed within opening of the contact hole 11a, thereby connecting the drain lead wire 27a and the first pixel electrode 17a together.

Figure 6:
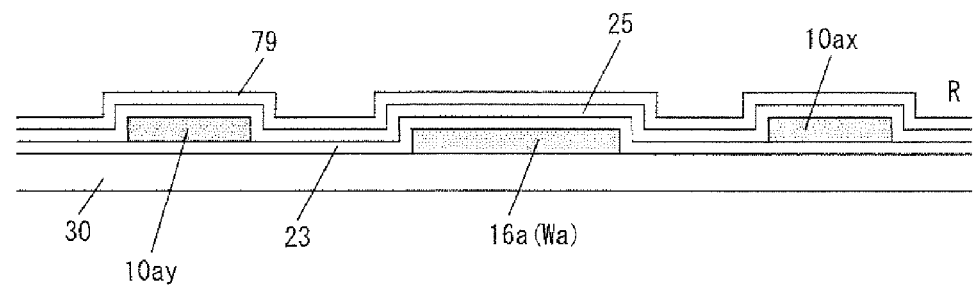
FIG. 6 is a cross sectional view taken on Broken line R shown in FIG. 3.

FIG. 6 is a cross sectional view taken on Broken line R in FIG. 3. As shown in FIGS. 3 and 6, the present active matrix substrate 3a is configured such that the first scanning electrode section 16a (scanning signal line 16) is provided on the substrate 30, and on the first scanning electrode section 16a, the gate insulating film 23 is provided. On the gate insulating film 23, the source extending electrodes 10ay and 10ax are provided, and on the source extending electrodes 10ay and 10ax, the interlayer insulating film (inorganic interlayer insulating film) 25 is provided. On the insulating film 25, the alignment film 79 is provided.

Figure 7:
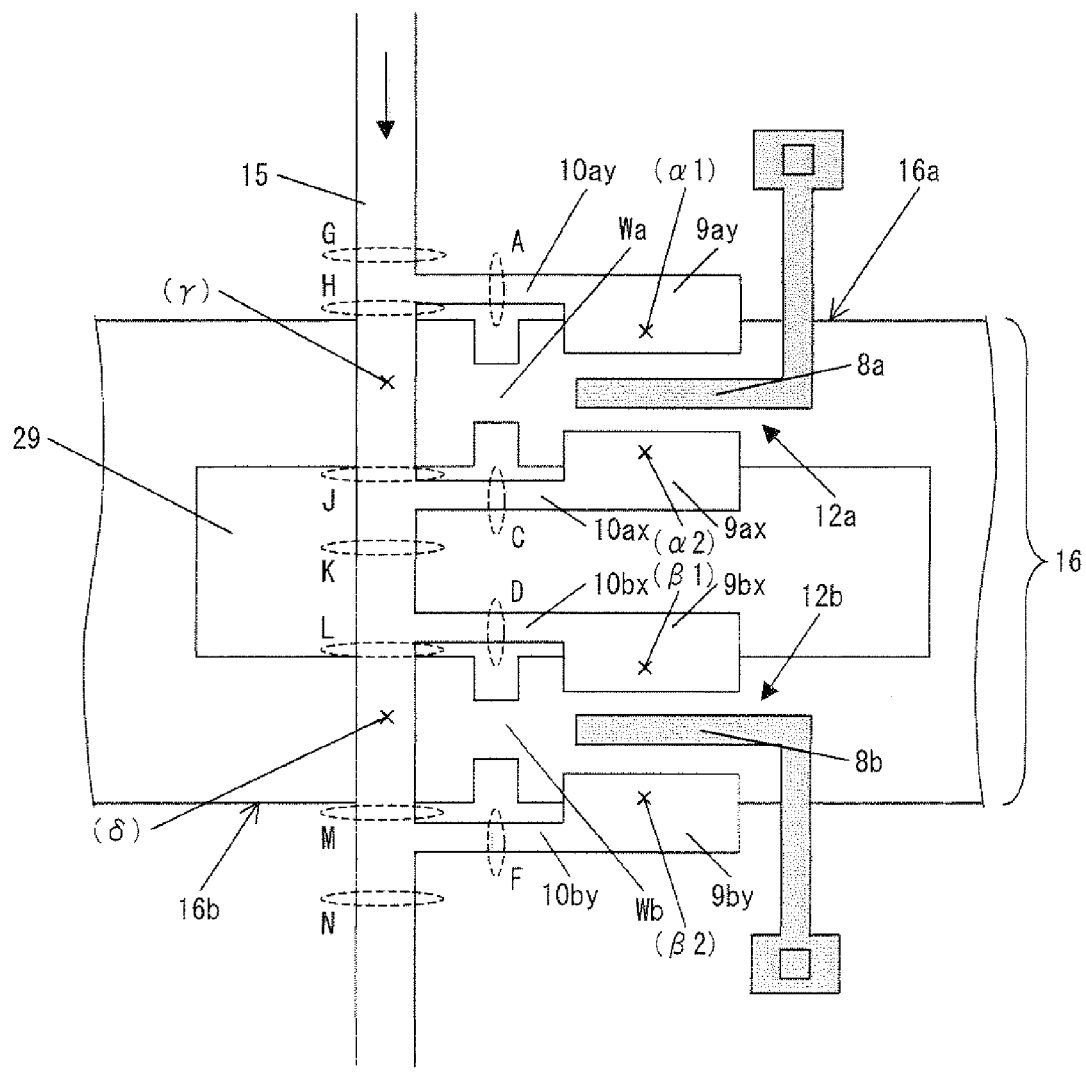
FIG. 7 is a plan view showing short-circuit points and corresponding disconnection points, in a case of repairing the active matrix substrate of FIG. 1.

The following explains how an SG leak is repaired in the present active matrix substrate 3a. FIG. 7 is an enlarged view of the vicinity of the first transistor 12a and the second transistor 12b in FIG. 1. A signal potential is supplied to the data signal line 15 in a downward direction in FIG. 7 (in direction of arrow). The SG leak can be possibly caused by a short circuit at even at least one of positions indicated by X signs in FIG. 7 (one of six points: α1, α2, β1, β2, γ, δ), in one pixel region. That is, the SG leak might be caused by short-circuiting at even at least one of the following points: (i) al, between the first scanning electrode section 16a and the source electrode 9ay, (ii) α2, between the first scanning electrode section 16a and the source electrode 9ax, (iii) β1, between the second scanning electrode section 16b and the source electrode 9bx, (iv) β2, between the second scanning electrode section 16b and the source electrode 9by, (v) γ, between the first scanning electrode section 16a and the data signal line 15; and (vi) δ, between the second scanning electrode section 16b and the data signal line 15.

On the other hand, in the repair step, a wire or an electrode is disconnected at least one point of A, C, D, F, G, H, J, K, L, M, and N in FIG. 7. The A, C, D, F, G, H, J, K, L, M, and N are located as follows: A is located in the source extension electrode 10ay at a section that faces the narrowed portion Wa of the first scanning electrode section 16a in plan view; C is located in the source extension electrode 10ax at a section that faces the narrowed portion Wa of the first scanning electrode section 16a in plan view; D is located in the source extension electrode 10bx at a section that faces the narrowed portion Wb of the second scanning electrode section 16b in plan view; F is located in the source extension electrode 10by at a section that faces the narrowed portion Wb of the second scanning electrode section 16b in plan view; G is located in the data signal line 15 in the upstream of a root of the source extension electrode 10ay; H is located in the data signal line 15 at a section sandwiched between the root of the source extension electrode 10ay and an upper intersection (an intersection between the data signal line 15 and the first scanning electrode section 16a); J is located in the data signal line 15 at a section sandwiched between a root of the source extension electrode 10ax and the upper intersection; K is located in the data signal line 15 at a section sandwiched between the root of the source extension electrode 10ax and a root of the source extension electrode 10bx; L is located in the data signal line 15 at a section sandwiched between a root of the source extension electrode 10bx and a lower intersection (an intersection between the data signal line 15 and the second scanning electrode section 16b); M is located in the data signal line 15 at a section sandwiched between a root of the source extension electrode 10by and the lower intersection; and N is located in the data signal line 15 in the downstream of the root of the source extension electrode 10by.

If an inspection step finds out where a short-circuit is occurred among α1, α2, β1, β2, γ, and δ, the following repair step is carried out. That is, if the short-circuit is occurred at α1, disconnection at A is carried out. If the short-circuit is occurred at α2, disconnection at C is carried out. If the short-circuit is occurred at β1, disconnection at D is carried out. If the short-circuit is occurred at β2, disconnection at F is carried out. If the short-circuit is occurred at γ, disconnection at H and J is carried out and an auxiliary wire is connected to the data signal line 15 in the downstream of J. If the short-circuit is occurred at γ, disconnection at L and M is carried out and an auxiliary wire is connected to the data signal line 15 in the downstream of M. In the case of the short circuit at any one of α1, α2, β1, and β2, the repair will not make the first transistor 12a and the second transistor 12b inoperable (because one source electrode operates in the transistor where the short circuit is occurred), and does not require connection of an auxiliary wire. On the other hand, if the short circuit is occurred at γ or δ, the repair step requires the connection of the auxiliary wire, however the first transistor and the second transistor 12b are operable even after the repair (because two source electrodes operate in each transistor).

If the short circuit is occurred at γ, disconnection at G and J or H and K may also be carried out. Also in this case, the connection of the auxiliary wire is necessary, however the repair does not make the first transistor and the second transistor 12b inoperable (because one source electrode operates in the first transistor 12a and two source electrodes operate in the second transistor 12a). Similarly, if the short circuit is occurred at δ, disconnection at L and N or K and M may also be carried out. Also in this case, the connection of the auxiliary wire is necessary, however the repair does not make the first transistor and the second transistor 12b inoperable (because two source electrodes operate in the first transistor 12a and one source electrode operates in the second transistor 12b).

If the inspection step including disconnection at K can specify whether the short-circuit is occurred in the first scanning electrode section side (α1, α2, or γ) or the second scanning electrode section side (β1, β2, or δ), the following repair step can be carried out. For example, in a case of the short-circuit in the first scanning electrode section, first, disconnection at H is carried out. If the SG leak is not resolved by this disconnection, the disconnection at A is further carried out. Even if the SG leak is resolved at either by the disconnection at H or by the further disconnection at A, the repair step requires connection of the auxiliary wire to the data signal line 15 in the downstream of K.

Figure 11:
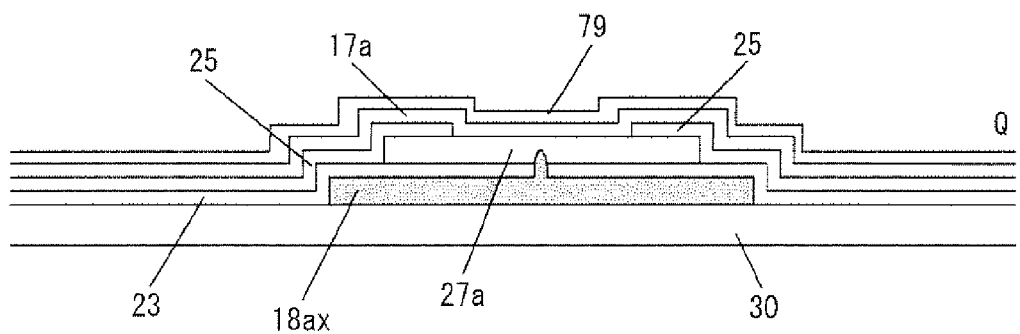
FIG. 11 is a cross sectional view illustrating a process for converting a bright dot to a black dot in the active matrix substrate shown in FIG. 1.
Figure 12:
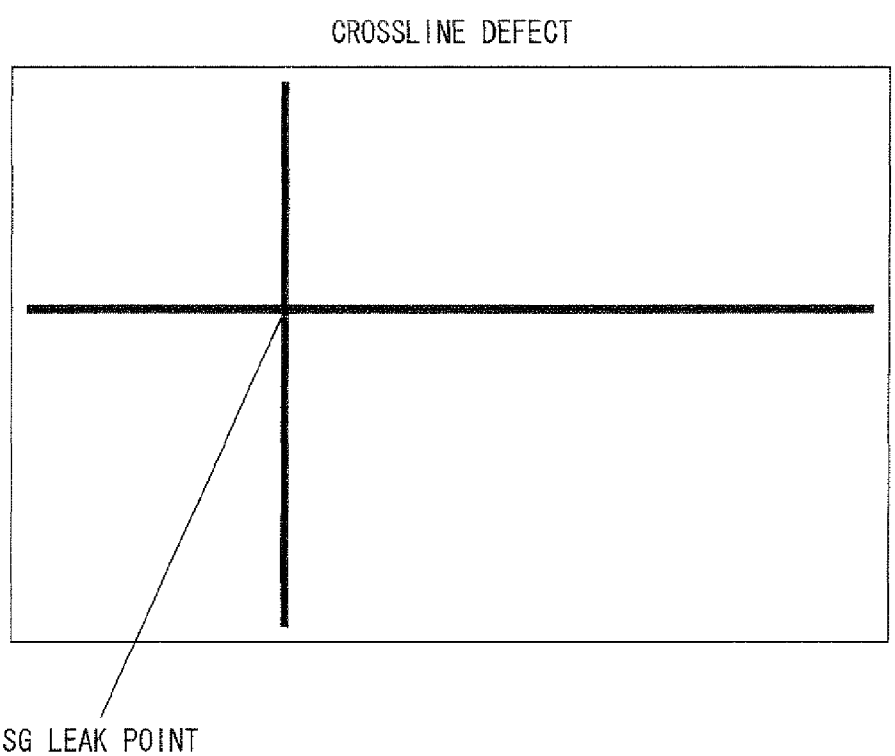
FIG. 12 is a schematic view showing a cross line defect caused by an SG leak.

In this case, if the SG leak is resolved by disconnecting at H (i.e., the short-circuit is occurred at γ or α2), the repair does not make the first transistor 12a and the second transistor 12b inoperable (because one source electrode operates in the transistor 12a). If the SG leak is not resolved by disconnecting at H (i.e., the short-circuit is occurred at α1), the disconnection at A is carried out. This causes the first transistor 12a to lose its function (meanwhile the second transistor 12b still operates). Accordingly, as shown in FIGS. 3 and 11, a connection between the drain drawing wire 27a and the first retention capacitor wire extension section 18ax (a process for converting a bright dot to a black dot) is carried out. Specifically, the first pixel electrode 17a is connected to the first retention capacitor wire 18a by connecting the end section of the drain lead wire 27a with the end section of the first retention capacitor wire extension section 18ax by melting. With this, in a liquid crystal display device including the present active matrix substrate, a subpixel which includes the first pixel electrode 17a connected to a defective transistor (12a) can be converted to a black dot.

On the other hand, in a case where it is unspecifiable which of points α1, α2, β1, β2, γ, and δ is short-circuited, the following repair step can be carried out. First, the disconnection at A is carried out. If the SG leak is not resolved by this disconnection, the disconnection at D is carried out. If the SG leak is not resolved even by this disconnection, the disconnection at C is carried out. If the SG leak is not resolved even by this disconnection, the disconnection at F is carried out. If the SG leak is not resolved even by this disconnection, disconnection at G and N are carried out and an auxiliary wire is connected to the data signal line 15 in the downstream of N.

In this case, if the SG leak is resolved by disconnecting at A (i.e., the short-circuit is occurred at α1), the repair does not make the first transistor 12a and the second transistors 12b inoperable (because one source electrode operates in the transistor 12a and two source electrodes operate in the transistor 12b). If the SG leak is resolved by the disconnection at D (i.e. the short-circuit is occurred at β1), the repair does not make the first transistor 12a and the second transistor 12b inoperable (because one source electrode operates in the transistor 12a and one source electrode operates also in the transistor 12b). If the SG leak is resolved by disconnecting at C (i.e. the short-circuit is occurred at α2), the repair does not make the second transistor 12b inoperable. However, since the first transistor 12a loses its function as a result of the repair, the connection between the drain lead wire 27a and the first retention capacitor wire extension section 18ax (the process for converting a bright dot to a black dot) is carried out. If the SG leak is resolved by disconnecting at F (i.e., the short-circuit is occurred at β2), the first transistor 12a and the second transistor 12b lose their functions as a result of the repair. Therefore, not only the connection between the drain lead wire 27a and the first retention capacitor wire extension section 18ax (process for converting a bright dot to a black dot) but also connection between the drain lead wire 27b and the second retention capacitor wire extension section 18bx (the process for converting a bright dot to a black dot) is carried out (see FIG. 1). If the SG leak is resolved in any of the above repairing, the connection of the auxiliary wire is unnecessary. If the SG leak is not resolved by disconnecting at F (i.e., short-circuited at γ or δ), the disconnection at G and N is carried out. Therefore, the connection of the auxiliary wire as mentioned above is necessary. Additionally, since the first transistor 12a and the second transistor 12b lose their function as a result of the repair, not only the connection between the drain lead wire 27a and the first retention capacitor wire extension section 18ax (the process for converting a bright dot to a black dot) but also the connection between the drain lead wire 27b and the second retention capacitor wire extension section 18bx (the process for converting a bright dot to a black dot) is necessary (see FIG. 1).

Figure 8:
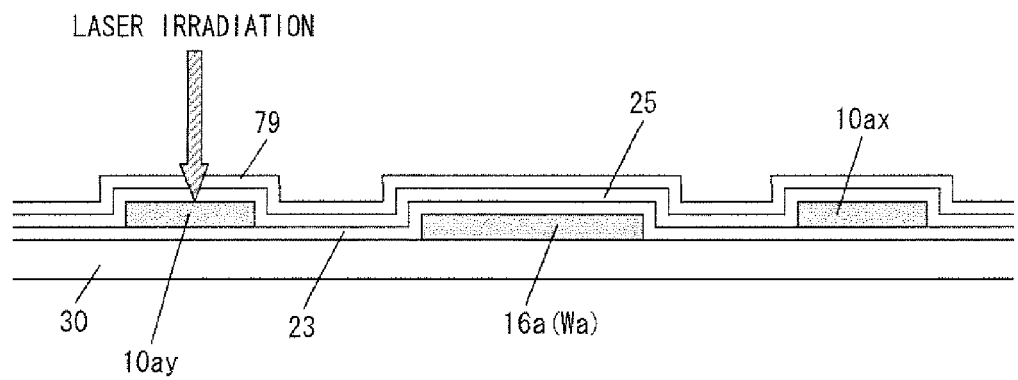
FIG. 8 is a cross sectional view illustrating a method for repairing the active matrix substrate shown in FIG. 1.

FIG. 8 is a cross sectional view illustrating how the disconnection at A is carried out. As shown in FIG. 8, the disconnection (separation by destruction) in the repair step is carried out by irradiating a laser from above a surface of an active matrix substrate. The irradiation may be carried out with any kind of laser light. For example, the irradiation may be carried out with YAG (yttrium aluminum garnet) laser or the like. As for a wavelength in use, fourth harmonic of YAG laser (266 nm in wavelength) or the like is usable.

One example of a method for detecting an SG leak in an active matrix substrate is using a modulator in which optical transmittance changes in accordance with electric field intensity. A transparent electrode is provided on one surface of the modulator, and the other surface of the modulator acts as a light reflecting surface. Here, an active matrix substrate is provided on the side of the modulator on which the light reflecting surface is provided, and an electric field is generated between the active matrix substrate and the transparent electrode of the modulator. Then, light is irradiated to the inside of the modulator from above the surface on which the transparent electrode is provided. This light transmits through the inside of the modulator and is reflected at the light reflecting surface of the modulator. The light thus reflected is received by a CCD (charge-coupled device) camera, so as to specify position of a short-circuit (SG leak position) in accordance with the intensity of this reflected light. If an SG leak is occurred, pixel regions on a short-circuited scanning signal line and pixel regions including transistors connected to a short-circuited data signal line are recognized as a cross line defect. Therefore, by a microscopic confirmation of an intersection of the cross line, coordinates of the short circuit (SG leak position) can be found out (see FIG. 12).

The SG leak may also be detected by an appearance inspection that utilizes pattern detection. That is, patterns of reflected light are compared between adjacent pixel regions, and an SG leak is detected in accordance with a comparison result thereof.

The active matrix substrate 3a is configured such that the drain electrode 8a is provided on the first scanning electrode section 16a, and the two source electrodes 9ax and 9ay provided such that the drain electrode 8a is sandwiched therebetween overlap corresponding edges of the first scanning electrode. That is, the source electrode 9ax overlaps the opening 29 and the first scanning electrode section 16a, and the source electrode 9ay overlaps the first scanning electrode section 16a and the outside region of the first scanning electrode section 16a. Hence, even if alignments of the drain electrode 8a and the source electrodes 9ax and 9ay slide in the column direction with respect to the scanning signal line 16, no change is occurred in the sum of an area in which the first source electrode and the second source electrode 9ay overlap the first scanning electrode section 16a. This is because, for example, an increase in an overlapping area of the source electrode 9ax on the first scanning electrode section 16a due to an alignment shift causes a decrease in an overlapping area of the first source electrode 9ay on the first scanning electrode 16a. That is, it is possible to dramatically suppress fluctuation in a parasitic capacitance between the first scanning electrode section 16a and the source electrodes 9ax and 9ay, which fluctuation would be caused by the alignment shift otherwise. The same applies to a relationship between the second scanning electrode section 16b and the source electrodes 9bx and 9by. In this way, the active matrix substrate 3a is capable of suppressing a decrease in display quality which is occurred by variation in the parasitic capacitance for each exposed area in the photolithography process.

The following explains one embodiment of a method for manufacturing an active matrix substrate.

First, on a transparent insulating substrate of glass, plastic, or the like, (i) a metal film of titanium, chrome, aluminum, molybdenum, tantalum, tungsten, copper, or the like, (ii) an alloy film of these metals, or (iii) a laminated film in which the metal film or the alloy film is included is formed by a method such as sputtering, so as to have a thickness of 1000 Å to 3000 Å. Such a film is patterned by photo-etching to a shape as required, so as to form scanning signal lines (also serving as a gate electrode of each transistor), retention capacitor wires, and retention capacitor wire extension sections. In the present active matrix substrate, the scanning signal lines have openings (thereby having two scanning electrode sections formed on either side of the openings), and a narrowed portion is formed to each of the scanning signal electrode sections.

Next, (i) a silicon nitride film (SiNx) serving as a gate insulating film, (ii) a high-resistance semiconductor layer of amorphous silicon, polysilicon, or the like, and (iii) a low-resistance semiconductor layer of n+amorphous silicon or the like are sequentially formed by plasma CVD (chemical vapor phase deposition) technique or the like, and are patterned by photo-etching. The silicon nitride film serving as the gate insulating film has a film thickness of, for example, around 3000 Å to 5000 Å, the amorphous silicon film serving as the high-resistance semiconductor layer has a film thickness of, for example, around 1000 Å to 3000 Å, and the n+amorphous silicon film serving as the low-resistance semiconductor layer has a film thickness of, for example, around 400 Å to 700 Å.

Subsequently, (i) a metal film of titanium, chrome, aluminum, molybdenum, tantalum, tungsten, copper, or the like, (ii) an alloy film of these metals, or (iii) a laminated film in which the metal film or the alloy film is included is formed by a method such as sputtering, so as to have a thickness of 1000 Å to 3000 Å. Such a film is patterned by photo-etching or the like to a shape as required, so as to form data signal lines, source electrodes, drain electrodes, drain lead wires, and source extension electrodes. In the present active matrix substrate, one of two source extension electrodes provided so as to sandwich the scanning electrode section is provided above the opening (of the scanning signal line), and the other source extension electrode is provided off the scanning signal line.

Then, channel etching is carried out on the high-resistance semiconductor layer (i layer) of the amorphous silicon film or the like and the low-resistance semiconductor layer (n+layer) of the n+amorphous silicon film or the like, by dry etching by use of patterns of the data signal line, the source electrode, the drain electrode, the source extending electrode, and the drain drawing wire as a mask. This process optimizes a thickness of the i layer, and provides each of the transistors (channel regions). Here, the semiconductor layer which is not covered by the data signal lines, the source electrodes, the drain electrodes, and the drain lead wires is etched away, and the i layer is thinned to a thickness necessary for the transistors to exhibit their abilities.

Next, an interlayer insulating film is formed so as to cover each transistor (channel region), the data signal lines, the source electrodes, the drain electrodes, and the drain lead wires. The interlayer insulating film may be (i) a photosensitive acrylic resin film, (ii) an inorganic insulating film of silicon nitride, oxide silicon, or the like, (iii) a laminated film of the photosensitive acrylic resin film and the inorganic insulating film, or (iv) another film as the like. Here, the interlayer insulating film may be (i) the silicon nitride film which is formed by the plasma CVD technique or the like and has a thickness of about 2000 Å to 5000 Å, (ii) the photosensitive acrylic resin film which is formed by spin coating and has a thickness of 20000 Å to 40000 Å, or (iii) a laminated film of the silicon nitride film and the photosensitive acrylic resin film. In the present active matrix substrate, a silicon nitride film is formed as the interlayer insulating film (the interlayer insulating film 25 in FIGS. 4 to 6, or a passivation film). Furthermore, the interlayer insulating film may be a polyimide resin film, a nonphotosensitive resin film, a spin-on glass (SOG) film, or the like.

Subsequently, a hole is formed by etching the interlayer insulating film in accordance with a position of a contact hole. Here, for example, photosensitive resist is patterned by photolithography (by exposure and development), and the photosensitive resist is etched.

Then, on the interlayer insulating film, for example a transparent conductive film of ITO (indium tin oxide), IZO, zinc oxide, tin oxide, or the like is formed to have a thickness of about 1000 Å to 2000 Å by sputtering or the like. The transparent conductive film is patterned by photo-etching or the like to the shape as required to form each pixel electrode. In an active matrix substrate applied to an MVA liquid crystal panel, each pixel electrode is formed to have a slit or the like.

Next, an alignment film is applied by an ink-jet technique or the like. In the way described above, an active matrix substrate is formed.

Furthermore, the steps of detecting and repairing a short circuit point (SG leak) are carried out at least after the pixel electrodes are formed, in the case of using the aforementioned modulator for the detection. On the other hand, in the case of using the pattern recognition for the detection, the aforementioned steps can be carried out after formation of the data signal line or after channel etching.

The following explains a method and the like for filling liquid crystal between an active matrix substrate and a color filter substrate which is a counter substrate to the active matrix substrate.

Liquid crystal may be filled by such a method (vacuum filling method) that: thermosetting sealing resin is provided with an inlet via which liquid crystal is to be introduced; the inlet is soaked with liquid crystal under vacuum; the liquid crystal is filled by exposing the liquid crystal and the substrates to atmosphere; and thereafter the inlet is sealed with UV cure resin or the like. Moreover, liquid crystal may also be filled by a one drop filling process as described below.

UV cure sealing resin which includes a spacer such as fiberglass is applied on a circumference of the active matrix substrate, and liquid crystal is dropped on the color filter substrate by the one drop process. With the one drop process, a suitable amount of the liquid crystal can be regularly dropped in an inner part of the seal. The drop amount is determined by a cell gap value and a value of volume of a cell in which liquid crystal needs to be filled.

Subsequently, in order to adhere the color filter substrate and the active matrix substrate, each of which has been subjected to seal patterning and one drop filling of liquid crystal as mentioned above, an atmosphere in an adhering device is decompressed to 1 Pa. Under such a decompressed state, the substrates are adhered together. By having the atmosphere in an atmospheric pressure, a sealed part is crushed.

Then UV is irradiated by a UV cure device so as to semi-cure the sealing resin. Next, the sealing resin is baked so as to be finally cured. At this point, the liquid crystal is spread inside the sealing resin, and the liquid crystal is filled in a cell.

On the color filter substrate, (i) colored layers (R, G, and B) disposed in a matrix pattern so as to correspond to each pixel of the active matrix substrate, (ii) a black matrix provided in gaps between the colored layers, (iii) a counter electrode (common electrode), and the like are formed. By adhering such a color filter substrate with the present active matrix substrate, and introducing and sealing liquid crystal as mentioned above, the present liquid crystal panel is formed.

Figure 9:
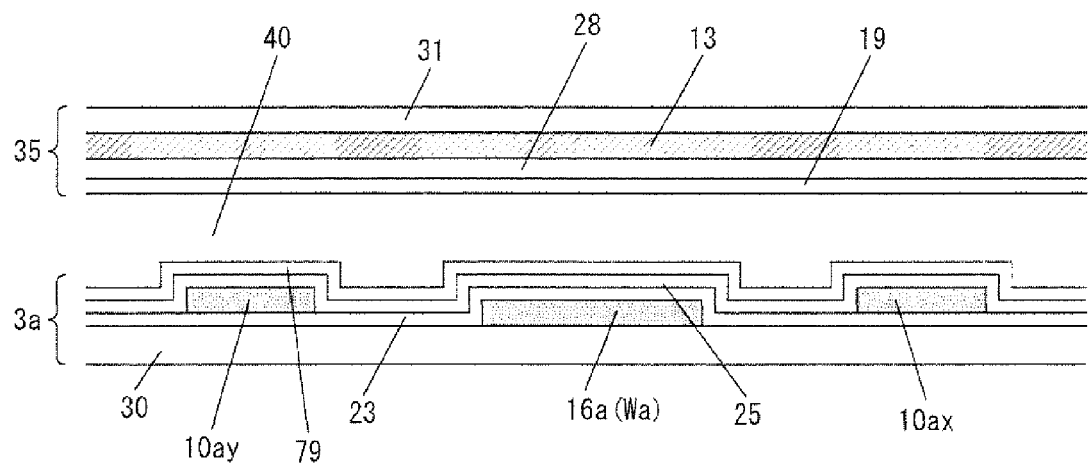
FIG. 9 is a cross sectional view showing the configuration of the liquid crystal panel including the active matrix substrate of FIG. 1.

FIG. 9 is a cross sectional view (a cross sectional view taken on Broken line R in FIG. 3) showing an example of the present liquid crystal panel including the active matrix substrate of FIG. 1 (FIG. 3). The active matrix substrate 3a is as explained with reference to FIG. 6. As shown in FIG. 9, in a color filer substrate 35 of the present liquid crystal panel, a black matrix (BM) 13 is provided on a substrate 31. On the black matrix 13, a common electrode (counter electrode) 28 is provided. The common electrode 28 is covered with an alignment film 19. Then, a liquid crystal layer 40 is provided between the color filter substrate 35 and the active matrix substrate 3a.

The steps of detecting and repairing an SG leak may be carried out in the step of manufacturing an active matrix substrate as mentioned above, however the steps can be carried out after the active matrix substrate has been made into a liquid crystal panel. In this case, by disposing polarization plates to both sides of the liquid crystal panel and supplying a predetermined electric signal to the liquid crystal panel, a predetermined image is displayed by backlighting the liquid crystal panel. If the SG leak occurs, pixel regions on the short-circuited scanning signal line and pixel regions including the transistor connected to the short-circuited data signal line are recognized as a cross line defect. Therefore, as mentioned above, a coordinate position of a short circuit (a point of SG leak) can be detected by observing an intersection of a cross line from above the active matrix substrate by use of a microscope while the liquid crystal panel is displayed (see FIG. 12). The details of the repair which follow the detection are similar to those in the aforementioned step of repairing the active matrix substrate.

Figure 10:
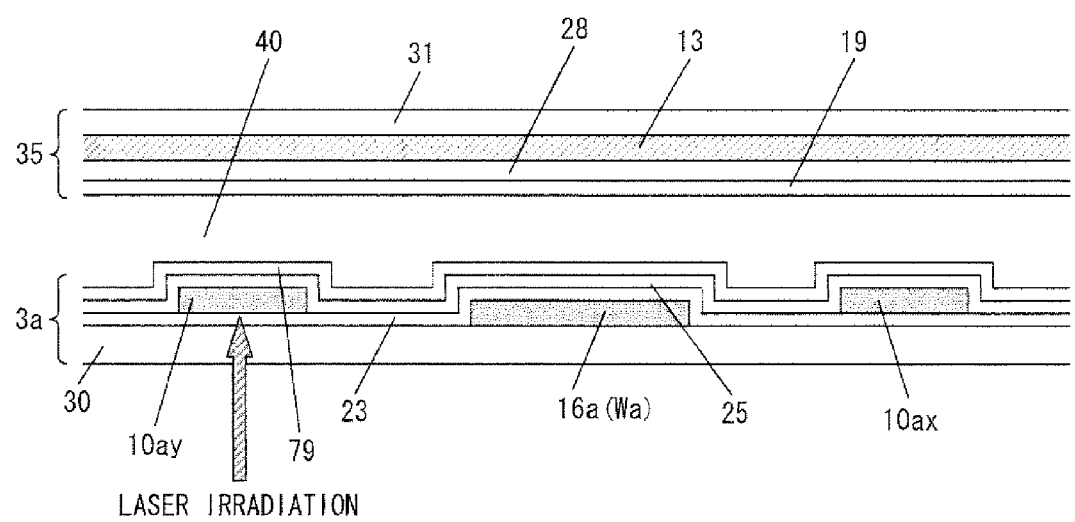
FIG. 10 is a cross sectional view illustrating a method for repairing the liquid crystal panel shown in FIG. 9.

FIG. 10 is a cross sectional view illustrating a disconnection of the source extension electrode 10ay in the liquid crystal panel shown in FIG. 9. As shown in the drawing, the disconnection (separation by destruction) of the electrode is carried out by irradiating a laser to the liquid crystal panel from a rear side thereof.

As mentioned above, although it is sufficient that the steps of detecting and repairing the SG leak (a short-circuit) are carried out to the active matrix substrate before or after the active matrix substrate is fabricated to the liquid crystal panel, it is also possible to carry out to the active matrix substrate before and after the active matrix substrate is fabricated to the liquid crystal panel. By carrying out the detection and the repair steps to the active matrix substrate before and after the active matrix substrate is fabricated to the liquid crystal panel, a situation where defective products including defects might be transferred to subsequent steps (e.g., later-described steps of manufacturing a liquid crystal display unit or a television receiver) can be avoided at a higher rate.

Second Embodiment

Figure 13:
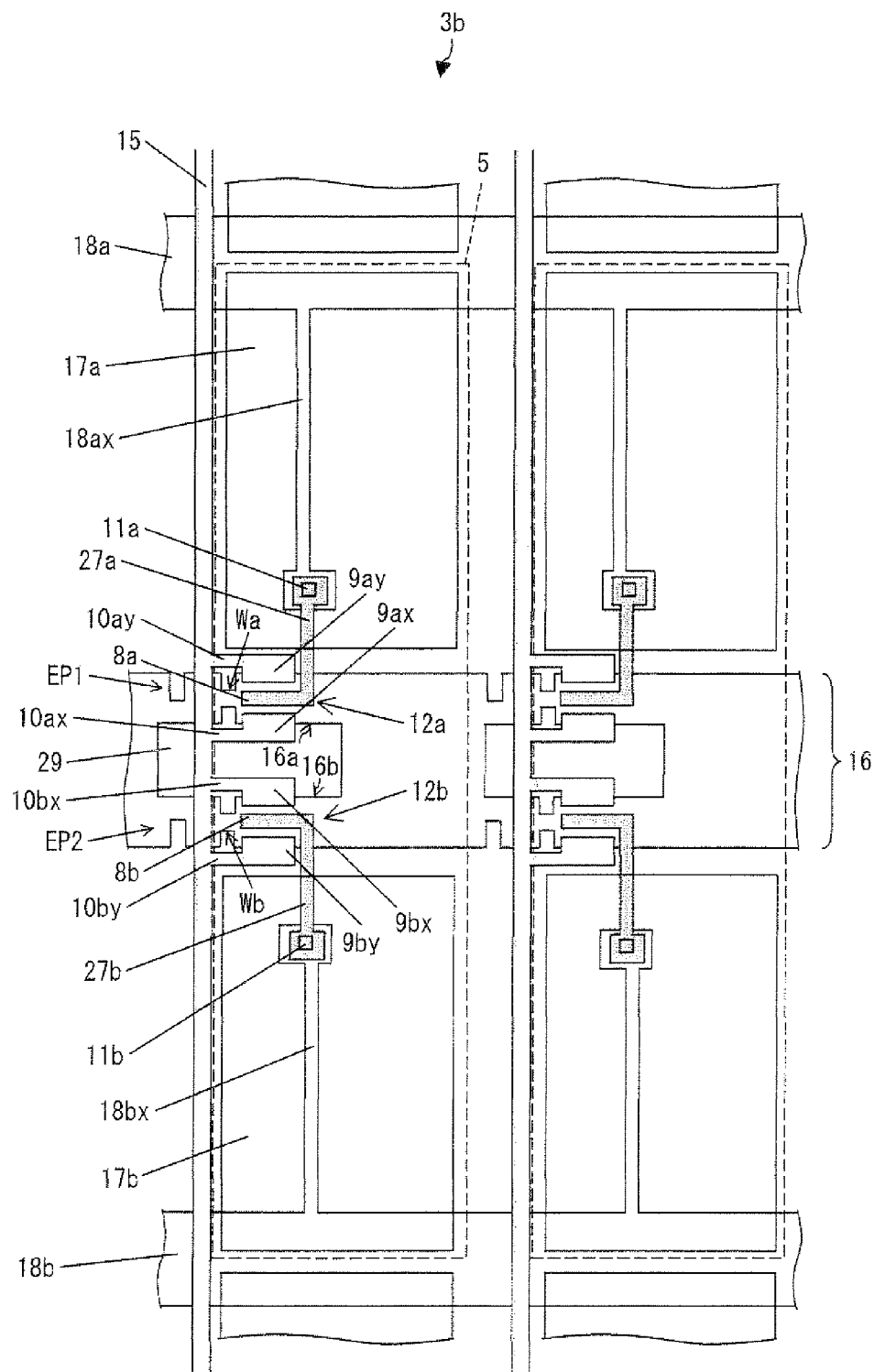
FIG. 13 is a plan view showing a configuration of an active matrix substrate according to Second Embodiment.
Figure 14:
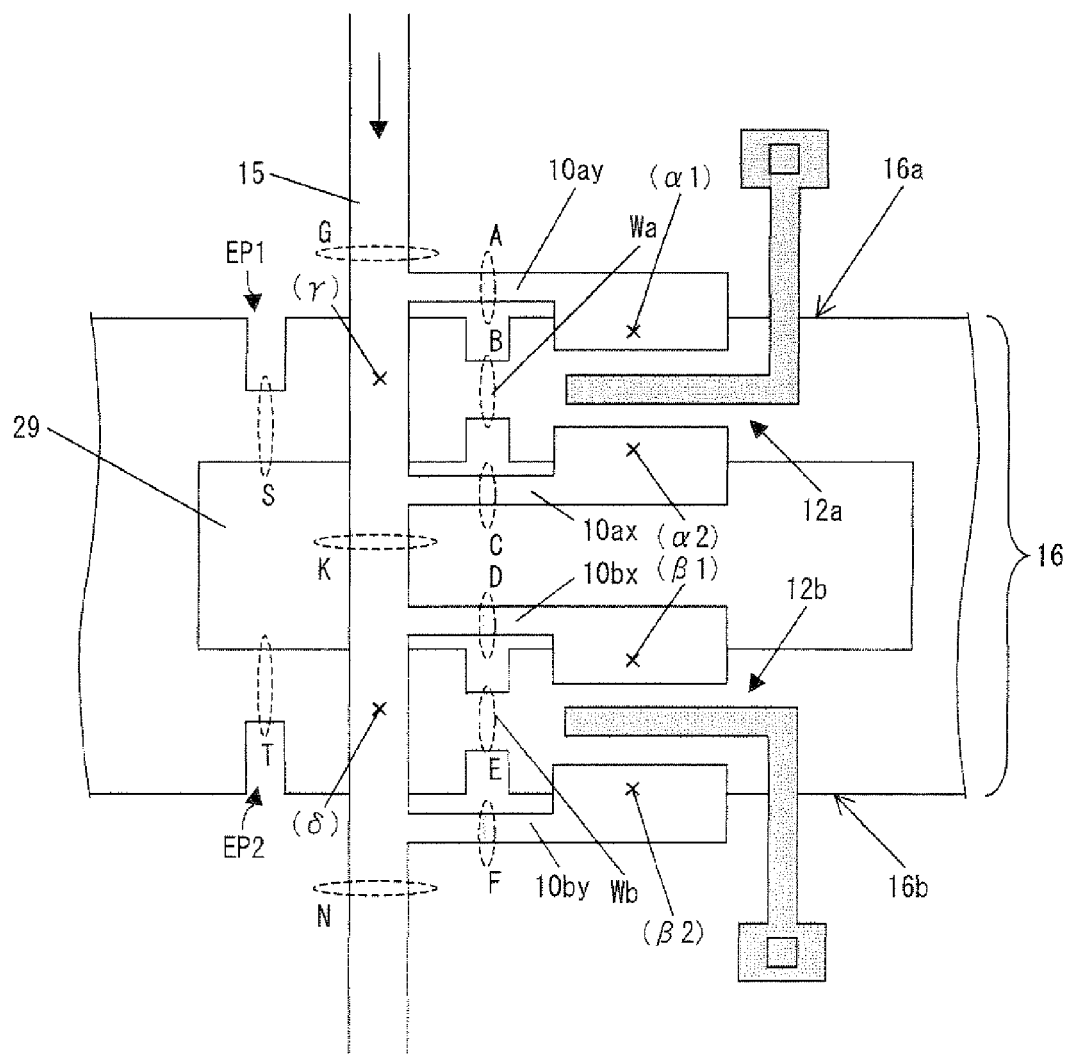
FIG. 14 is a plan view showing short-circuit points and corresponding disconnection points, in a case of repairing the active matrix substrate of FIG. 13.

The active matrix substrate 3a of FIG. 1 may be modified as follows. Namely, a slit is provided at an end section EP1 of the first scanning electrode section 16a outside the pixel region, and a slit is provided at an end section EP2 of the second scanning electrode section 16b outside the pixel region, so that these parts are narrowed for easy disconnection. FIG. 13 illustrates an active matrix substrate 3b which has this configuration. The following description explains how the SG leak is repaired in the present active matrix substrate 3b. FIG. 14 is an enlarged view in the vicinity of the first transistor 12a and the second transistor 12b in FIG. 13. A signal potential is supplied to the data signal lines 15 in a downward direction (direction of the arrow) in FIG. 13. Points where the SG leak is possibly occurred ($\alpha 1$, $\alpha 2$, $\beta 1$, $\beta 2$, $\gamma$, $\delta$) are as described with reference to FIG. 7.

In a repair step, disconnection of a wire or an electrode is carried out at least one of A, C, D, F, G, K, N, B and S, and E and T shown in FIG. 14. B is at the narrowed portion Wa of the first scanning electrode section 16a. E is at the narrowed portion Wb of the second scanning electrode section 16b. S is at a part of the end section EP1 of the scanning electrode section 16a. T is at a part of the end section EP2 of the second scanning electrode 16b. The other points (A, C, D, F, G, K, N) are as explained with reference to FIG. 7.

If an inspection step finds out where a short-circuit is occurred among the points $\alpha 1$, $\alpha 2$, $\beta 1$, $\beta 2$, $\gamma$, or $\delta$, the following repair step can be carried out. Namely, if the short-circuit is occurred at $\alpha 1$, disconnection is carried out at A; if the short-circuit is occurred at $\alpha 2$, disconnection is carried out at C; if the short-circuit is occurred at $\beta 1$, disconnection is carried out at D; if the short-circuit is occurred at $\beta 2$, disconnection is carried out at F; if the short-circuit is occurred at $\gamma$, disconnection is carried out at S and B, and if the short-circuit is occurred at $\delta$, disconnection is carried out at T and E. With this configuration, in a case where a short-circuit is occurred at one of $\alpha 1$, $\alpha 2$, $\beta 1$, and $\beta 2$, the repair will not make the first transistor 12a and the second transistor 12b inoperable (because the transistor which is short-circuited has one source electrode that operates), and does not require connection of an auxiliary wire. Moreover, in a case where the short-circuit is occurred at one of $\gamma$ and $\delta$, the repair does not make each of the first transistor 12a and the second transistor 12b inoperable (because each of the transistors 12a and 12b has two source electrodes that operate), and does not require connection of the auxiliary wire.

If the inspection step including disconnection at K can specify whether the short-circuit is occurred in the first scanning electrode section side (one of $\alpha 1$, $\alpha 2$, and $\gamma$) or on the second scanning electrode section side (one of $\beta 1$, $\beta 2$, and $\delta$), the following repair step can be carried out.

For example, if the short-circuit is occurred on the first scanning electrode section side, first, disconnection is carried out at S and B. If the SG leak is not resolved by disconnecting at S and B, disconnection is subsequently carried out at A. If the SG leak still is not resolved by disconnecting A, disconnection is then carried out at C. Regardless of which disconnection (disconnection at S and B, A, or C) resolves the SG leak, a connection of the auxiliary wire is required. In this case, if the SG leak is resolved by disconnecting at S and B (if short-circuited at $\gamma$), the repair does not make the first and second transistors 12a inoperable (because the transistor 12a has two source electrodes that operates). If the SG leak is resolved by disconnecting at A (i.e., the short-circuit is occurred at $\alpha 1$), the repair does not make the first and second transistors 12a inoperable (because the transistor 12a has one source electrode that operates). However, if the SG leak is not resolved by disconnecting at A (i.e., the short-circuit is occurred at $\alpha 2$), disconnection is carried out at C, thereby causing the first transistor 12a to lose its function as a result of the repair (meanwhile the second transistor 12b operates). Consequently, a connection between a drain lead wire 27a and a first retention capacity wire extension section 18ax (process for converting a bright dot to a black dot) is carried out (see FIG. 13).

Moreover, if it is completely unspecifiable which of the points $\alpha 1$, $\alpha 2$, $\beta 1$, $\beta 2$, $\gamma$, and $\delta$ is short-circuited, the following repair step can be carried out. First, disconnection is carried out at S and B. If this disconnection does not resolve the SG leak, subsequently disconnection is carried out at A. If this disconnection still does not resolve the SG leak, then disconnection is carried out at D. Furthermore, if disconnecting at D still does not resolve the SG leak, disconnection is carried out at C. Further, disconnection at F is carried out if the SG leak still is not resolved. If the SG leak still is not resolved after disconnecting at F, disconnection is carried out at G and N (or K and N) and an auxiliary wire is to be connected to the data signal line 15 in the downstream of N.

In this case, if the SG leak is resolved by disconnecting at S and B (i.e., the short-circuit is occurred at $\gamma$), the repair does not make each of the first transistor 12a and the second transistor 12b inoperable (because each of the transistors 12a and 12b has two source electrodes that operate). If the SG leak is resolved by disconnecting at A (i.e., the short-circuit is occurred at $\alpha 1$), the repair does not make each of the first transistor 12a and second transistor 12b inoperable (because the transistor 12a has one source electrode that operates and the transistor 12b has two source electrodes that operates). If the SG leak is resolved by disconnecting at D (i.e., the short-circuit is occurred at $\beta 1$), the repair does not make each of the first transistor 12a and second transistor 12b inoperable (because the transistor 12a has one source electrode that operates and the transistor 12b also has one source electrode that operates). If the SG leak is resolved by disconnecting at C (i.e., the short-circuit is occurred at $\alpha 2$), although the second transistor 12b is operable, the first transistor 12a loses its function as a result of the repair. Consequently, a connection between the drain lead wire 27a and a first retention capacity wire extension section 18ax (process for converting a bright dot to a black dot) is carried out (see FIG. 13). If the SG leak is resolved by disconnecting at F (i.e., the short-circuit is occurred at β2), the repair makes each of the first transistor 12a and the second transistor 12b lose its functions as a result of the repair. Consequently, not only a connection between the drain lead wire 27a and a first retention capacity wire extension section 18ax (process for converting a bright dot to a black dot) is carried out, but also a connection between a drain lead wire 27b and a second retention capacity wire extension section 18bx (process for converting a bright dot to a black dot) is carried out (see FIG. 13). If the SG leak is resolved in any one of the repairing until now, the connection of the auxiliary wire is not required. If the SG leak is still not resolved even after disconnecting at F (if short-circuited at δ), disconnection is carried out at G and N (or K and N). This requires the establishment of the foregoing connection of the auxiliary wire. In addition, the first transistor 12a and the second transistor 12b both lose their functions, therefore it is also required to establish connections (process for converting a bright dot to a black dot) between the drain lead wire 27a and the first retention capacity wire extension section 18ax and between the drain lead wire 27b and the second retention capacity wire extension section 18bx. Needless to say, instead of disconnecting at S and B, disconnection can be carried out at T and E.

In the present active matrix substrate 3b, a scanning electrode section that is short-circuited can be separated from the whole corresponding scanning signal line 16 itself in a case where a short-circuit is occurred below a respective data signal line 15. Thus, the number of cases which do not require the connection of the auxiliary wire increases. Moreover, in the present active matrix substrate 3b, the narrowed portions Wa and Wb for easily disconnecting the source extension electrodes may be used for disconnecting the scanning signal lines 16 (scanning electrode sections 16a and 16b). Hence, there is no need to separately provide a narrowed portion for disconnecting the scanning signal lines. This is advantageous in the point of reducing resistance and in the point of improvement in aperture ratio of the scanning signal lines.

Third Embodiment

The active matrix substrate 3a of FIG. 1 may be modified as follows. Namely, the source electrode 9ax of the first transistor, which source electrode 9ax is provided close to the opening 29, and the source electrode 9bx of the second transistor, which source electrode 9bx provided close to the opening 29, may be made integrally provided, so that a common source electrode 9z is provided.

Figure 15:
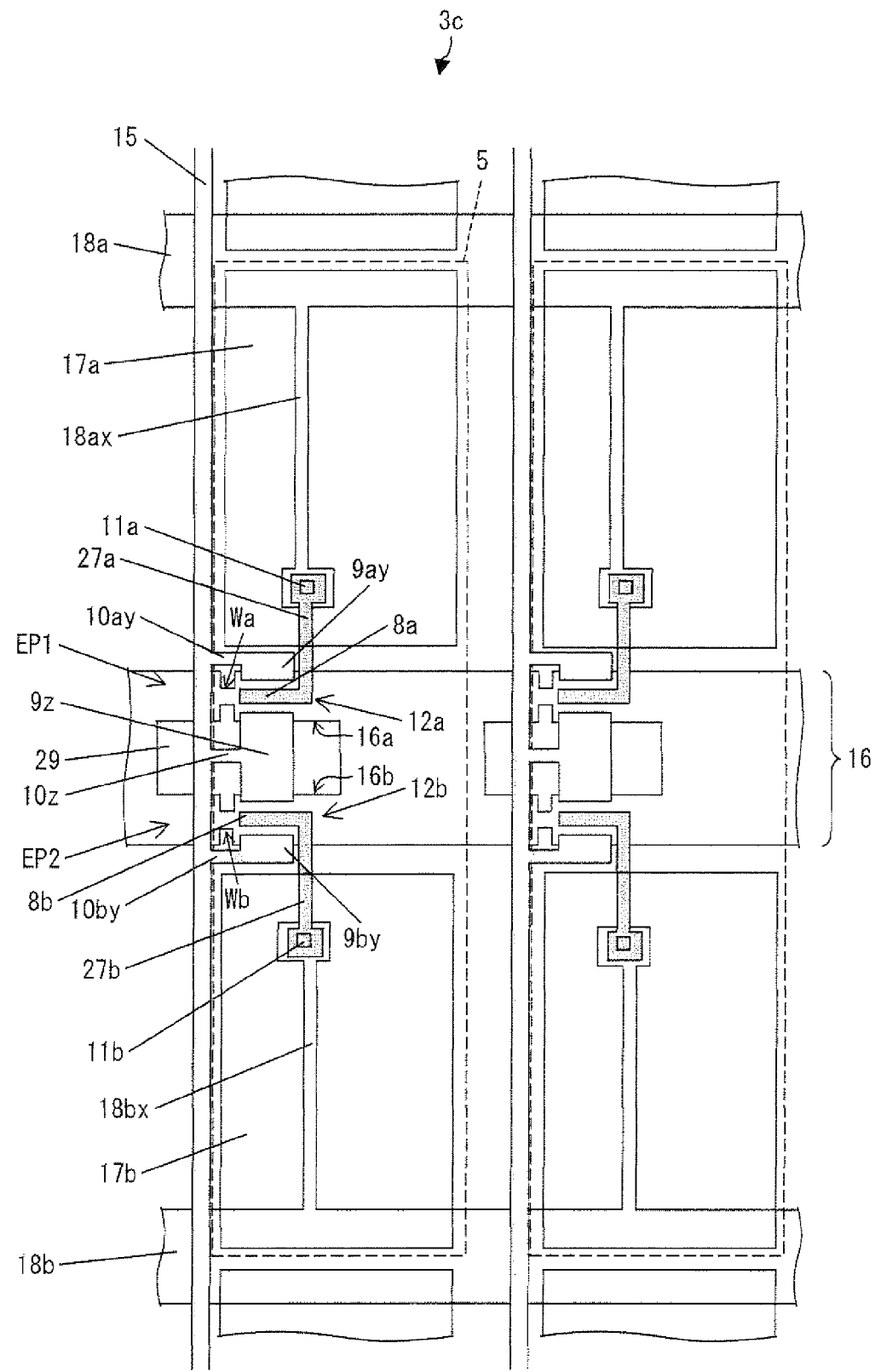
FIG. 15 is a plan view showing a configuration of an active matrix substrate according to Third Embodiment.

FIG. 15 illustrates an active matrix substrate 3c which has this configuration. As illustrated in FIG. 15, the first transistor 12a and a second transistor 12b have a common source electrode 9z; the common source electrode 9z is provided so as to overlap (i) the first scanning electrode 16a and the second scanning electrode 16b and (ii) the opening 29. Further, the common source electrode 9z is connected to the data signal line 15 via a source extension electrode 10z (common source extension electrode) provided above the opening 29. The drain electrode 8a is provided above the first scanning electrode section 16a, the source electrode 9ay is provided such that the drain electrode 8a is sandwiched between the source electrode 9ay and the common source electrode 9z, and the source electrode 9ay is connected to the data signal line 15 via a source extension electrode 10ay. The source extension electrode 10ay is provided so as to face the source extension electrode 10z in such a manner that the first scanning electrode section 16a is sandwiched between the source extension electrode 10z and the source extension electrode 10ay. Moreover, the drain electrode 8b is provided above the second scanning electrode section 16b, the source electrode 9by is provided such that the drain electrode 8b is sandwiched between the source electrode 9by and the common source electrode 9z, and the source electrode 9by is connected to the data signal line 15 via a source extension electrode 10ay. The source extension electrode 10ay is provided so as to face the source extension electrode 10z in such a manner that the second scanning electrode section 16b is sandwiched between the source extension electrode 10z and the source extension electrode 10ay.

Figure 16:
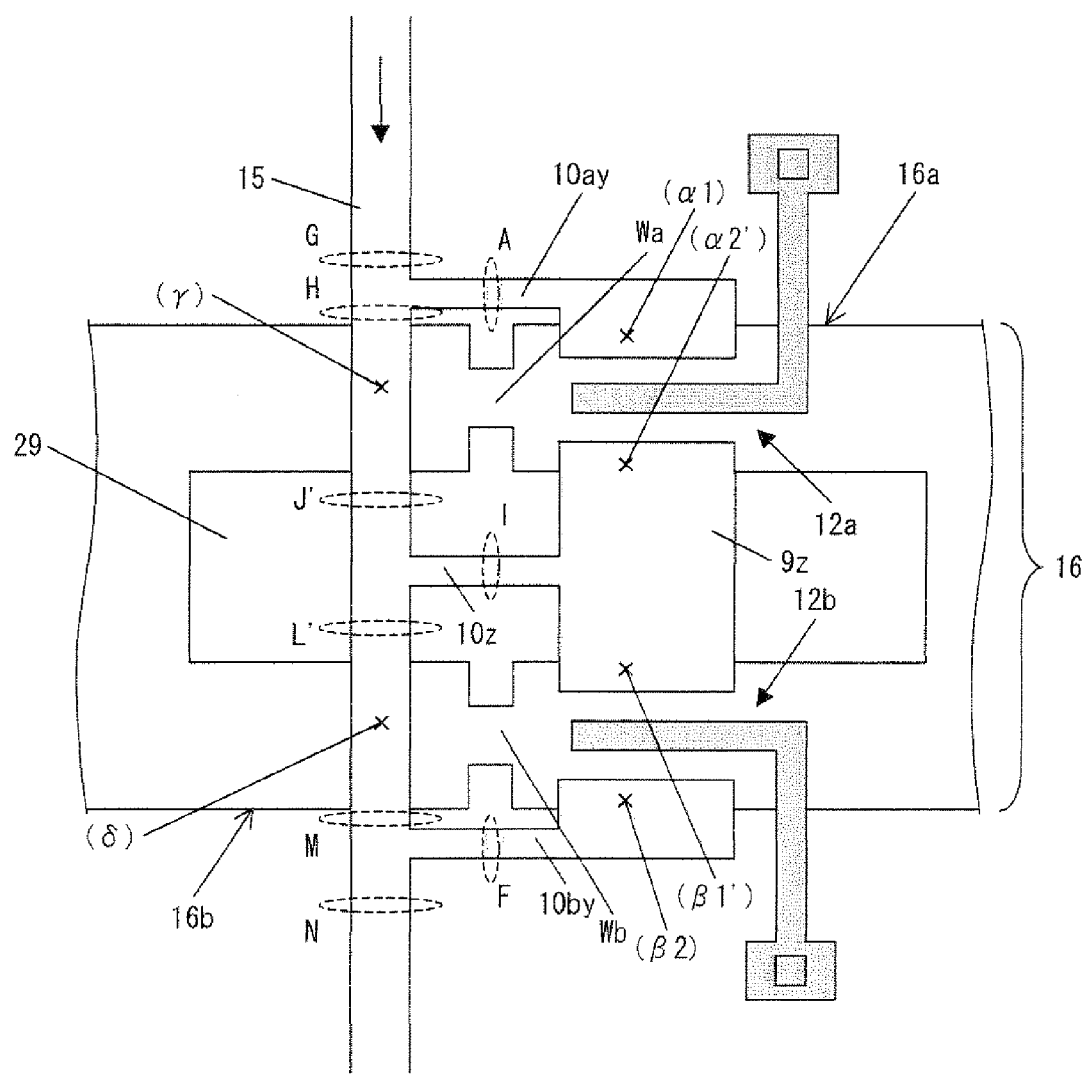
FIG. 16 is a plan view showing short-circuit points and corresponding disconnection points, in a case of repairing the active matrix substrate of FIG. 15.

The following description explains how an SG leak is repaired in the present active matrix substrate 3c. FIG. 16 is an enlarged view of the vicinity of the first transistor 12a and the second transistor 12b in FIG. 15. A signal potential is supplied to the data signal lines 15 in a downward direction (direction of the arrow) in FIG. 16. The SG leak is possibly caused by a short-circuit at least one of six points shown by an X mark in FIG. 16 (α1, α2', β1', β2, γ, δ). The first scanning electrode section 16a and the source electrode 9z are possibly short-circuited at α2', and the second scanning electrode section 16b and the source electrode 9z are possibly short-circuited at α1'. The others are as explained with reference to FIG. 7. Meanwhile, in the repair step, disconnection of a wire or an electrode is carried out at least one of points A, I, F, G, H, J', L', M and N in FIG. 16. I is a part of the source extension electrode 10z sandwiched between the narrowed portion Wa and the narrowed portion Wb. J' is a part of the data signal line 15 that is sandwiched between a root part of the source extension electrode 10z and an upper intersection (an intersection of the data signal line 15 and the first scanning electrode section 16a). L' is a part of the data signal line 15 that is sandwiched between the root part of the source extension electrode 10z and a lower intersection (an intersection of the data signal line 15 and the first scanning electrode section 16b). The other points (A, F, G, H, M, N) are as explained with reference to FIG. 7.

If an inspection step finds out where a short-circuit is occurred among α1, α2', β1', β2, γ, and δ, the following repair step may be carried out. That is to say, if the short-circuit is occurred at α1, disconnection is carried out at A; if the short-circuit is occurred at α2', disconnection is carried out at I; if the short-circuit is occurred at β1', disconnection is carried out at I; if the short-circuit is occurred at β2, disconnection is carried out at F; if the short-circuit is occurred at γ, disconnection is carried out at H and J' and also an auxiliary wire is connected to the data signal line 15 in the downstream of J'; and if the short-circuit is occurred at δ, disconnection is carried out at L' and M and also an auxiliary wire is connected to the data signal line 15 in the downstream of M.

Meanwhile, if it is completely unspecifiable which of the α1, α2', β2, γ, and δ is short-circuited, the following repair step may be carried out. First, disconnection is carried out at A. If this disconnection does not resolve the SG leak, subsequently disconnection is carried out at F. If this disconnection still does not resolve the SG leak, then disconnection is carried out at I. If the SG leak is resolved in any one of the repairing until now, the connection with the auxiliary wire is not required. If the SG leak still is not resolved after disconnecting at I, disconnection is carried out at G and N, and an auxiliary wire is to be connected to the data signal line 15 in the downstream of N.

In the active matrix substrate 3c, it is not required to provide separate source electrodes above the opening 29. Hence, it is possible to reduce a length of the opening 29 in a column direction (vertical direction in figure). As a result, a width of the scanning signal lines 16 is reduced, thereby increasing a pixel aperture ratio. Additional explanation of this point is as follows. Usually, a source electrode is formed in a photolithography step by applying a resist and patterning the resist by exposing the resist to light and developing the resist, and further carrying out etching by use of this pattern as a mask. Here, if the length of the opening 29 in the column direction (vertical direction in figure) is short, a surface level of the resist above the opening is affected by a surface level of the resist above the scanning electrode sections (on both sides of the opening). This causes a resist film provided above the opening to be thicker than the resist film provided above the scanning electrode sections. Hence, setting an amount of light exposure so as to suit a depth of the resist provided above the opening such that separate source electrodes can be provided to each of the transistors, causes edges of the electrodes to recede. As a result, a channel length becomes long in length. Thus, in a configuration in which electrodes drawn from the data signal line are provided separately above the opening, it is unavoidable to have a long opening 29 in a column direction (vertical direction in figure), such that the surface level of the resist provided above the opening does not follow the surface level of the resist provided above the scanning electrode sections. This causes the width of the scanning signal lines 16 to be broad in the pixel regions. However, in the active matrix substrate 3c, the source electrode drawn from the data signal line is not provided separately above the opening (a common source electrode is provided). Hence, such problem is resolved.

Furthermore, in the active matrix substrate 3c, the drain electrode 8a is provided above the first scanning electrode section 16a. The drain electrode 8a is sandwiched between the source electrodes 9z and 9ay (9z is the common source electrode); and the source electrodes 9z and 9ay are provided so as to stretch over edges of the first scanning electrode. That is to say, the common source electrode 9z overlaps the opening 29 and the first scanning electrode section 16a, and the source electrode 9ay overlaps the first scanning electrode section 16a and an external region of the first scanning electrode 16a. Therefore, even if an alignment of the drain electrode 8a and the source electrodes 9z and 9ay slide in the column direction with respect to the scanning signal lines 16, a sum of an area in which the first scanning electrode section 16a and the source electrodes 9z and 9ay overlap do not change. Namely, it is possible to remarkably suppress a change in parasitic capacitance between the first scanning electrode section 16a and the source electrodes 9z and 9ay caused by alignment displacement. The same can be applied for a relation between the second scanning electrode section 16b and the source electrodes 9z and 9by. As such, it is possible to suppress display quality deterioration which may occur by having various parasitic capacitance for each exposed area in the photolithography process, by the active matrix substrate 3c.

Moreover, in the active matrix substrate 3c, the opening 29 has at least a part of a section which overlaps one of sides (upper side in figure) of regions on either side of the source extension electrode 10z expanding in a column direction, in order to form the narrowed portion Wa in the first scanning electrode section 16a; and has at least a part of a section which overlaps the other side (lower side in figure) of the regions expanding in the column direction, in order to form the narrowed portion Wb in the second scanning electrode section 16b. However, if a width of the opening 29 in the column direction is for example a size in which the source extension electrode 10z can be disconnected, a width of the first scanning electrode section 16a and the second electrode section 16b may be made wider by not expanding the opening 29 in the column direction.

Fourth Embodiment

Figure 17:
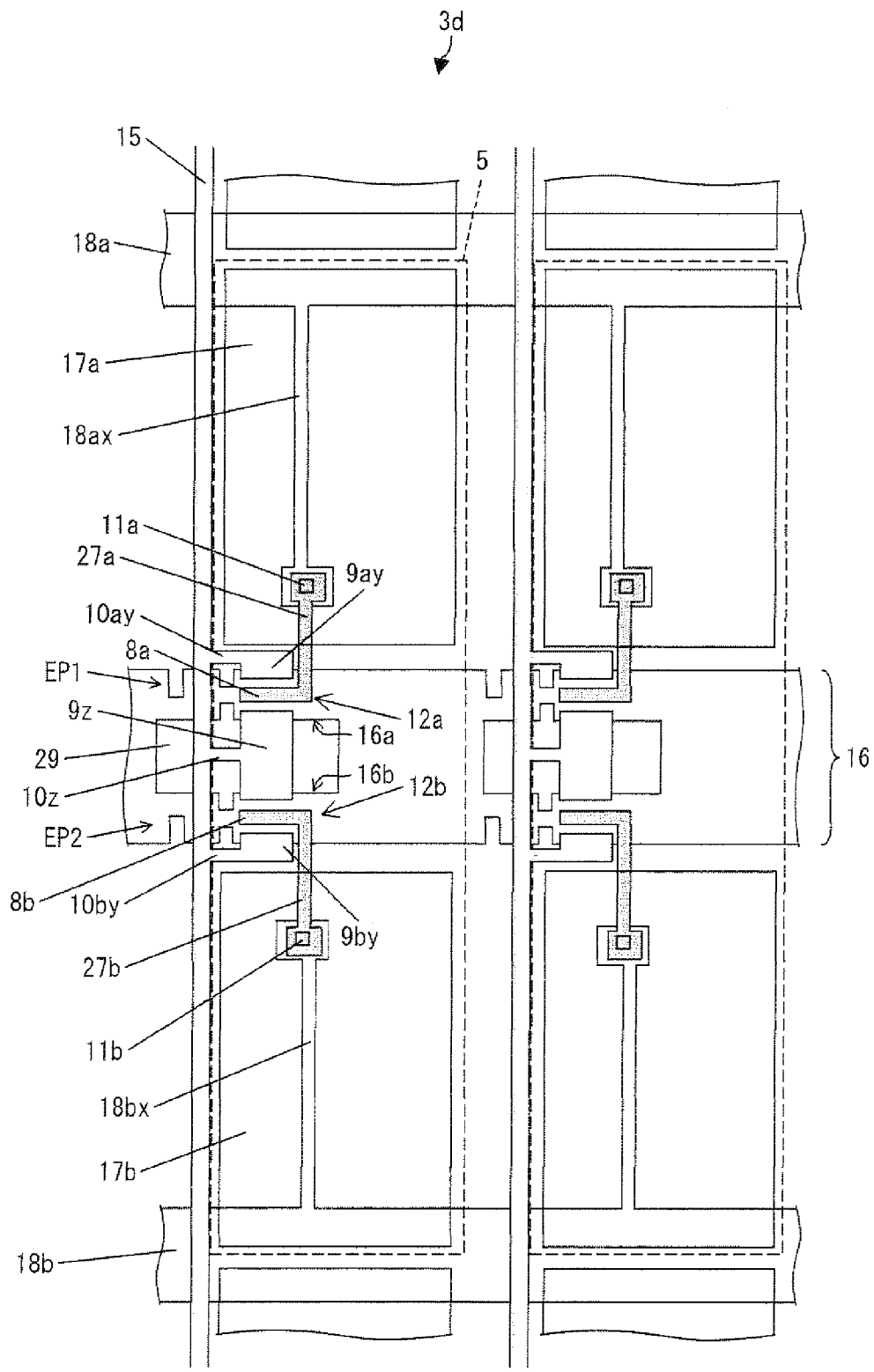
FIG. 17 is a plan view showing a configuration of an active matrix substrate according to Fourth Embodiment.
Figure 18:
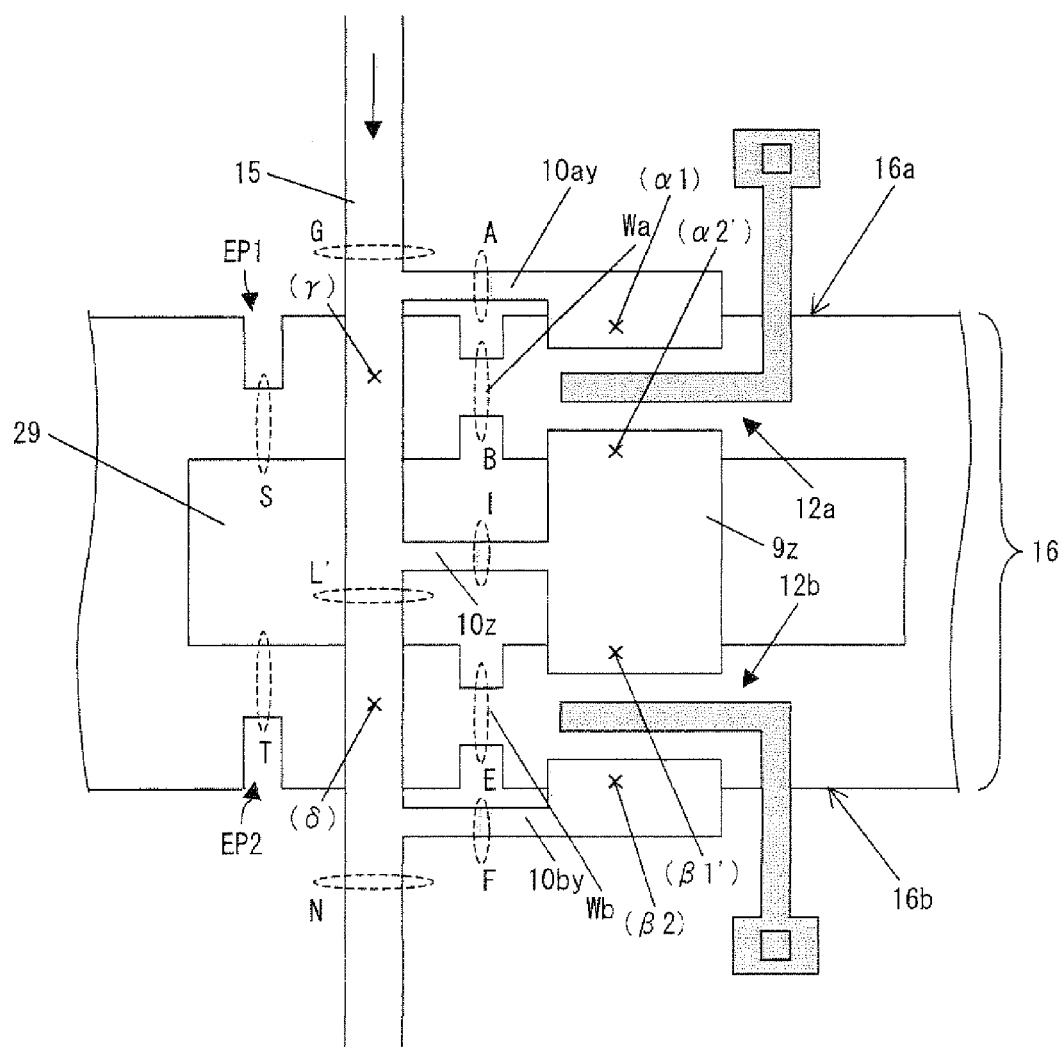
FIG. 18 is a plan view showing short-circuit points and corresponding disconnection points, in a case of repairing the active matrix substrate of FIG. 17.

The active matrix substrate 3c of FIG. 15 may have slits cut at end sections EP1 of the first scanning electrode sections 16a which end sections EP1 are provided outside respective pixel regions, and have slits cut at end sections EP2 of the second scanning electrode sections 16b which end sections EP2 are provided outside the respective pixel regions. These slits narrow the end sections EP1 and EP2, thereby allowing easy disconnection. FIG. 17 illustrates an active matrix substrate 3d which has this configuration. The following description explains how the SG leak is repaired. FIG. 18 is an enlarged view of the vicinity of the first transistor 12a and the second transistor 12b in FIG. 17. A signal potential is to be supplied to the data signal lines 15 in a downward direction (direction of arrow) in the figure. Points in which the SG leak is possibly caused ($\alpha 1$, $\alpha 2'$, $\beta 1'$, $\beta 2$, $\gamma$, $\delta$) are as described with reference to FIG. 16. Moreover, disconnection of a wire or an electrode in the repair step is carried out at least one of the A, I, F, G, L'N, B and S, and E and T. Explanations of each of these points are as described with reference to FIGS. 16 and 14.

If an inspection step finds out where a short-circuit is occurred among $\alpha 1$, $\alpha 2'$, $\beta 1'$, $\beta 2$, $\gamma$, and $\delta$, the following repair step may be carried out. Namely, if the short-circuit is occurred at $\alpha 1$, disconnection at A is carried out; if the short-circuit is occurred at $\alpha 2'$, disconnection at I is carried out; if the short-circuit is occurred at $\beta 1'$, disconnection at I is carried out; if the short-circuit is occurred at $\beta 2$, disconnection at F is carried out; if the short-circuit is occurred at $\gamma$, disconnection at S and B are carried out; and if the short-circuit is occurred at $\delta$, disconnection at T and E are carried out. All of these cases do not require a connection of an auxiliary wire in the repair step.

Meanwhile, in a case where it is unspecifiable which of points $\alpha 1$, $\alpha 2'$, $\beta 2$, $\gamma$, and $\delta$ is short-circuited, the following repair step may be carried out. First, disconnection is carried out at S and B. If the SG leak is not resolved by this disconnection, subsequently disconnection is carried out at A. If the SG leak is not resolved by this disconnection, then disconnection is carried out at F. Furthermore, if the SG leak is not resolved by the disconnection at F, disconnection is carried out at I. If the SG leak is resolved in any one of the repairing until now, the connection of the auxiliary wire is not required. If the SG leak still is not resolved after disconnecting at I, disconnection is carried out at G and N (or L' and N) and an auxiliary wire is to be connected to the data signal line 15 in the downstream of N.

In the present active matrix substrate 3d, a scanning electrode section that is short-circuited can be separated from the corresponding whole scanning signal line 16 itself in a case where a short-circuit is occurred under the respective data signal line 15. Thus, the number of cases which do not require the connection of the auxiliary wire increases. Moreover, in the present active matrix substrate 3d, the narrowed portions for easily disconnecting the source extension electrodes may be used for disconnecting the corresponding scanning signal line 16 (scanning electrode sections 16a and 16b). Hence, there is no need to separately provide a narrowed portion for disconnecting the scanning signal lines, which is advantageous in the point of reducing resistance and in the point of improvement in aperture ratio of the scanning signal lines.

Fifth Embodiment

Figure 19:
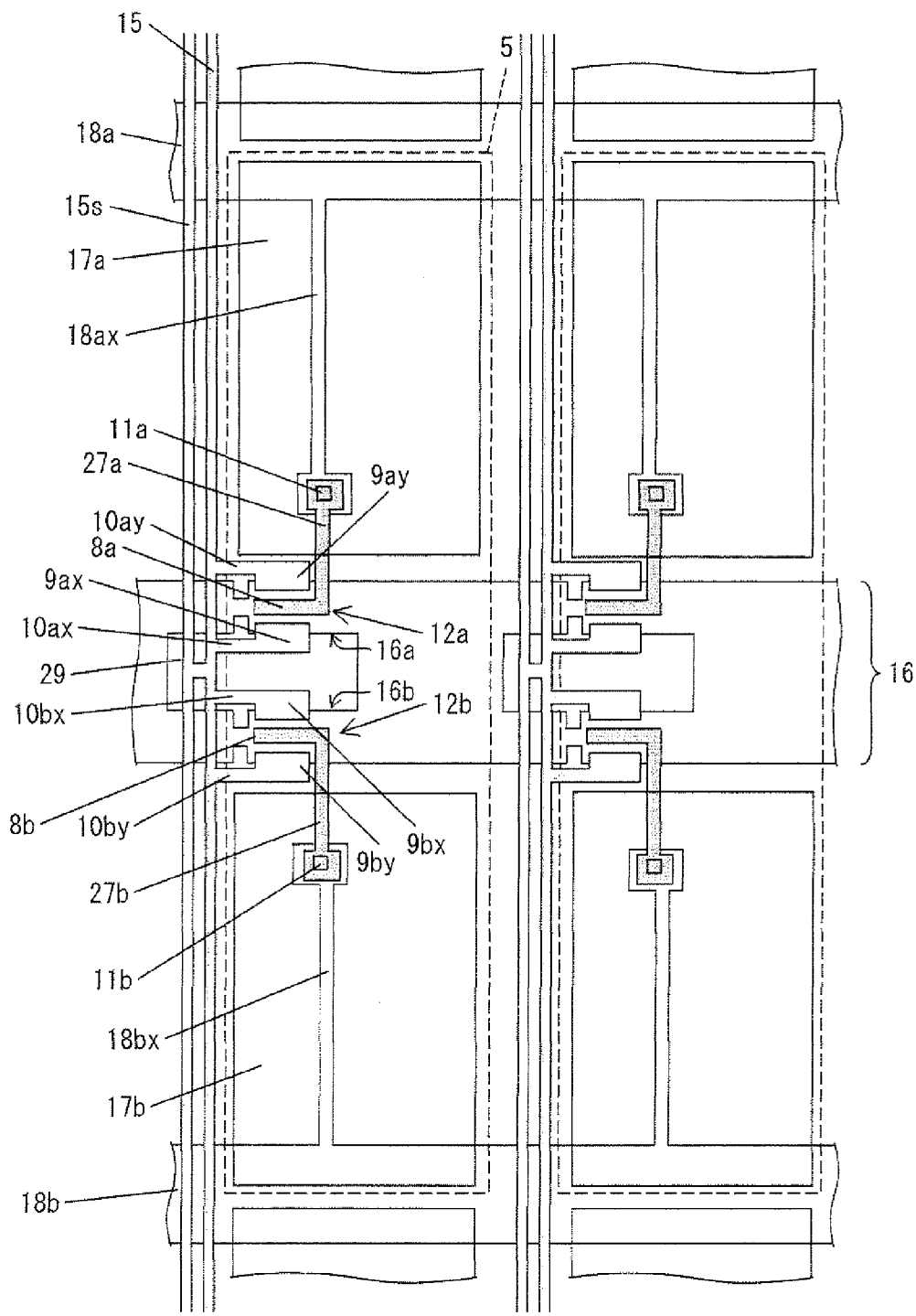
FIG. 19 is a plan view showing a configuration of an active matrix substrate according to Fifth Embodiment.
Figure 20:
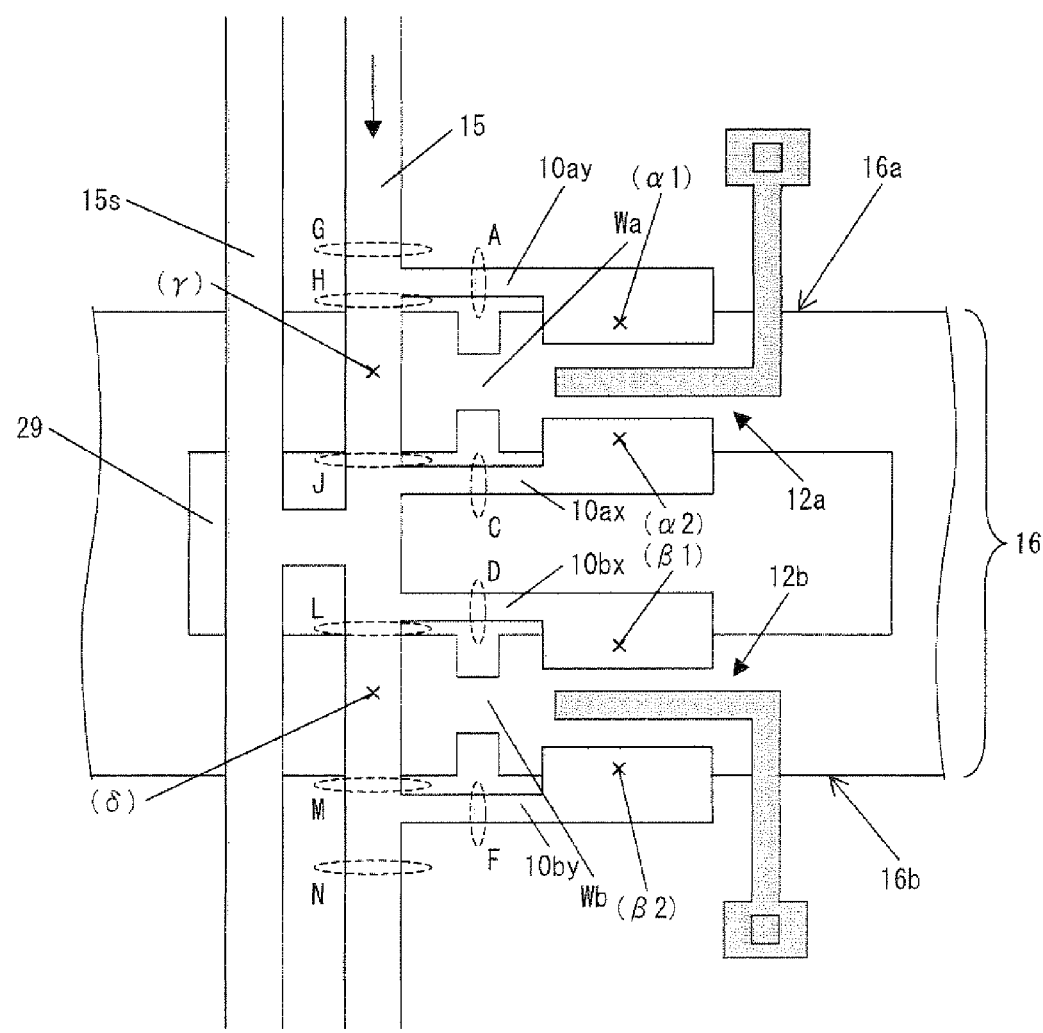
FIG. 20 is a plan view showing short-circuit points and corresponding disconnection points, in a case of repairing the active matrix substrate of FIG. 19.

The active matrix substrate 3a in FIG. 1 may be arranged such that subwires 15x are provided along the data signal lines 15, and a corresponding one of the data signal lines 15 and a corresponding one of the subwires are connected above a corresponding one of the openings 29. This configuration is illustrated in FIG. 19. The following description explains how this configuration allows repair of the SG leak. FIG. 20 is an enlarged view of the vicinity of a first transistor 12a and a second transistor 12b in FIG. 19. A signal potential is to be supplied to the data signal lines 15 in a downward direction (direction of arrow) in the figure. Points in which the SG leak may be caused (α1, α2, β1, β2, γ, δ) are as described with reference to FIG. 7. Moreover, disconnection of a wire or an electrode in the repair step is carried out at least one of A, C, D, F, G, H, J, L, M, and N. Explanations of each point are as explained with reference to FIG. 7.

If an inspection step finds out where a short-circuit is occurred among α1, α2, β1, β2, γ, or δ, the following repair step may be carried out. Namely, if the short-circuit is occurred at α1; disconnection at A is carried out; if the short-circuit is occurred at α2, disconnection at C is carried out; if the short-circuit is occurred at β1, disconnection at D is carried out; if the short-circuit is occurred at β2, disconnection at F is carried out; if the short-circuit is occurred at γ, disconnection at H and J are carried out; and if the short-circuit is occurred at δ, disconnection at L and M are carried out. All of these cases do not require a connection of an auxiliary wire in the repair step. Moreover, in the case where a short-circuit is occurred at γ, disconnection may be carried out at G and J. Similarly to this, in the case where a short-circuit is occurred at δ, disconnection at L and N may be carried out.

Meanwhile, in a case where it is unspecifiable which of α1, α2, β1, β2, γ, and δ is short-circuited, the following repair step may be carried out. First, disconnection is carried out at H and J. If the SG leak is not resolved by this disconnection, subsequently disconnection is carried out at L and M. If the SG leak is not resolved by this disconnection, then disconnection is carried out at A. If the SG leak is not resolved by this disconnection, then disconnection is carried out at D. Furthermore, if the SG leak is not resolved by disconnecting at D, disconnection is carried out at C; and if the SG leak is still not resolved, further disconnection at F is carried out. Connection of an auxiliary wire is required for none of the cases in which the SG leak resolves at the aforementioned repairing (disconnection at H and J, L and M, A, D, C, or F).

Figure 21:
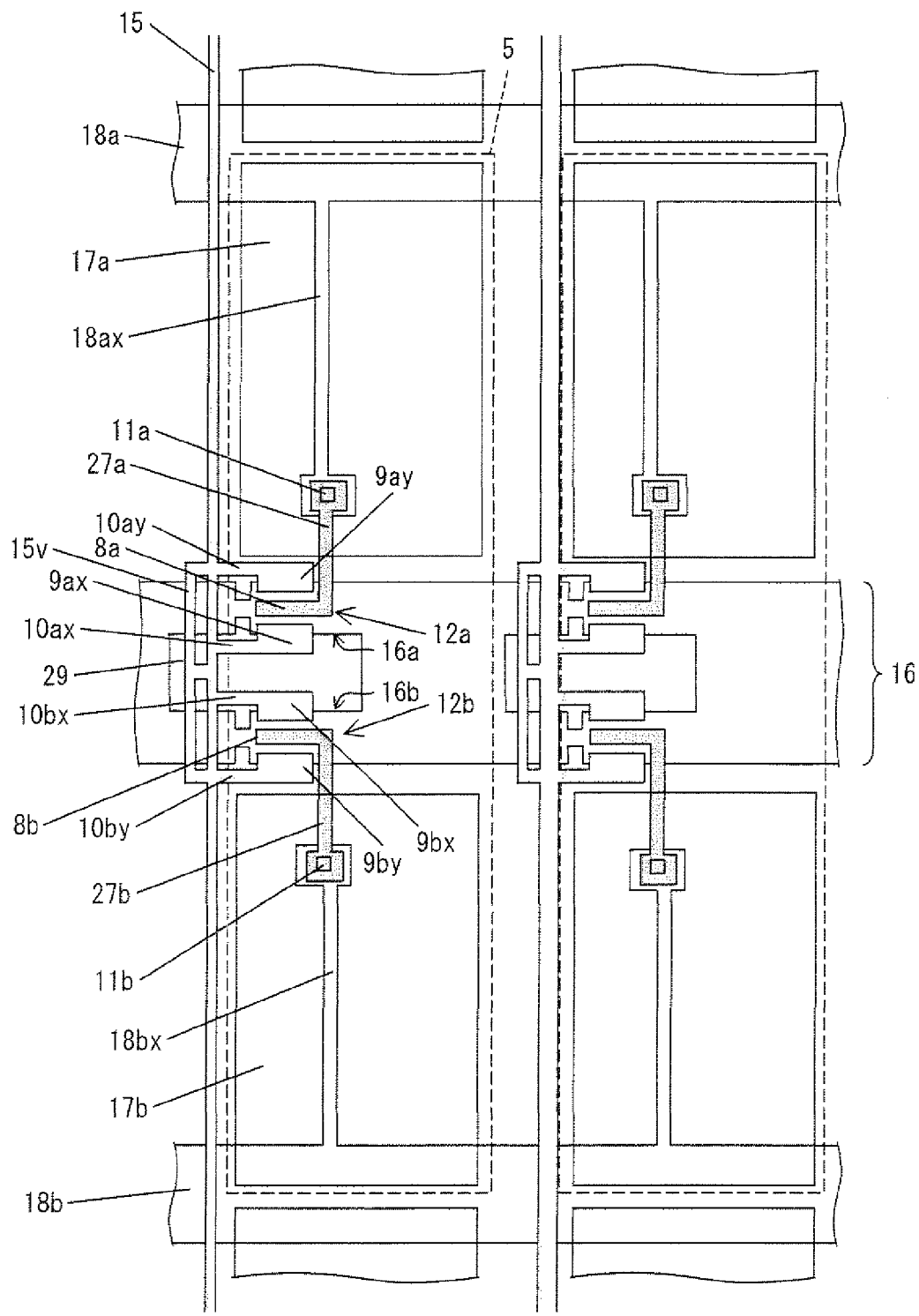
FIG. 21 is a plan view showing another configuration of the active matrix substrate according to Fifth Embodiment.

The active matrix substrate in FIG. 20 may also be modified as in FIG. 21. Namely, in substitute of the subwires 15s in FIG. 20, bypass wires 15v may be provided in such a manner that the bypass wires 15v stretch over a corresponding first scanning electrode section 16a, a corresponding opening 29, and a corresponding second scanning electrode section 16b. Further, the bypass wires 15v are connected to (i) a vicinity of a section connecting the source extension electrode 10ay and the data signal line 15, (ii) a part of the data signal line 15 above the opening 29, and (iii) a vicinity of a section connecting the source extension electrode 10ay and the data signal line 15. How the SG leak is repaired in this configuration is the same as with the configuration of FIG. 20.

Sixth Embodiment

In the foregoing active matrix substrates, an interlayer insulating film provided above the first and second transistors may have a laminated configuration. For example, this interlayer insulating film includes an inorganic interlayer insulating film and an organic interlayer insulating film thicker than the inorganic interlayer insulating film. This configuration prevents peeling off of metal (source metal and gate metal) at the thick interlayer insulating film in a case where source extension electrodes and scanning signal lines are disconnected by irradiating a laser to the active matrix substrate from a rear side of the liquid crystal panel after the active matrix substrate is fabricated to the liquid crystal panel. Particularly, this is effective in a configuration in which the scanning signal lines 16 are provided thick in order to reduce resistance, however the scanning signal lines 16 can still be disconnected. This reduces a possibility of a G-C short-circuit (short-circuit between scanning signal lines and common electrode of CF) at a time of repair.

Figure 22:
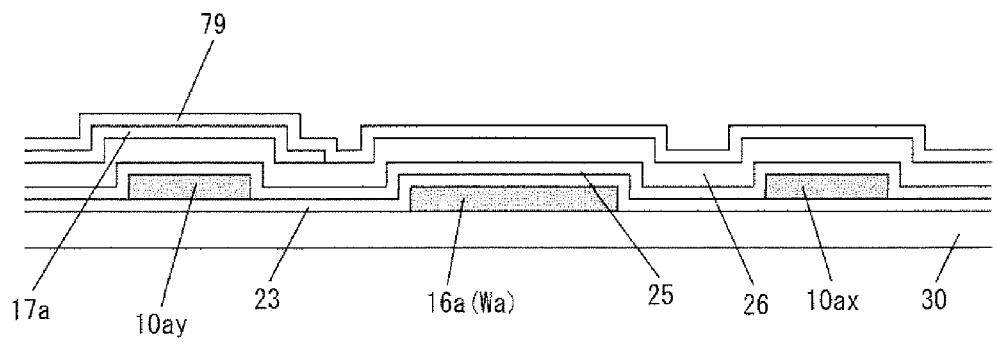
FIG. 22 is a cross sectional view showing a configuration of an active matrix substrate according to Sixth Embodiment.
Figure 23:
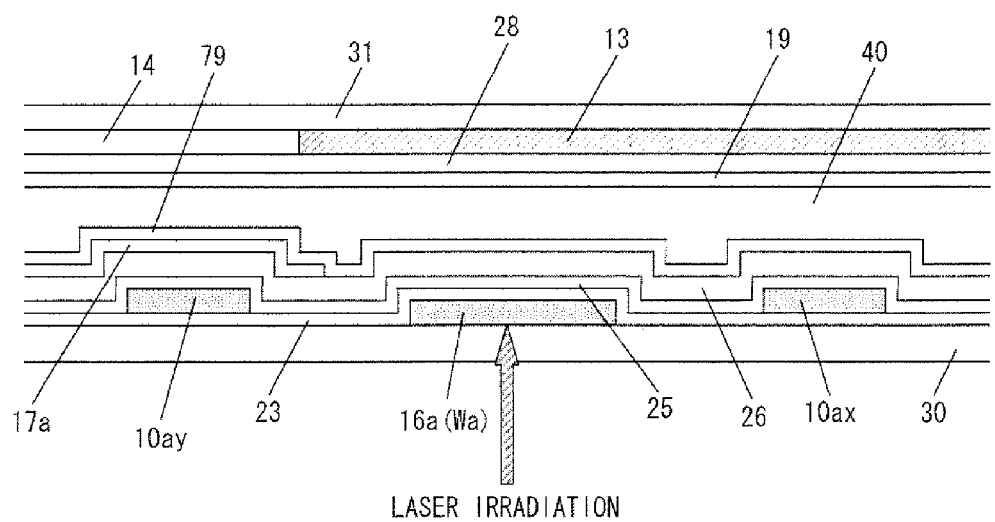
FIG. 23 is a cross sectional view showing a configuration of a liquid crystal panel including the active matrix substrate of FIG. 22.

FIG. 22 is a cross sectional view (cross sectional view including the narrowed portions Wa and Wb, and the first pixel electrode 17a) illustrating a configuration of an active matrix substrate in which the interlayer insulating film provided above the first and second transistors has a laminated configuration. As illustrated in FIG. 22, a first scanning electrode section 16a (scanning signal line 16) is provided on the substrate 30, and the gate insulating film 23 is provided on the first scanning electrode section 16a. Source extension electrodes 10ay and 10ax are provided on the gate insulating film 23. An inorganic interlayer insulating film 25 is provided on the source extension electrodes 10ay and 10ax, and on the inorganic interlayer insulating film 25, an organic interlayer insulating film 26 is provided, which organic interlayer insulating film 26 is thicker than the interlayer insulating film 25. Further, a first electrode 17a is provided on the organic interlayer insulating film 26. FIG. 23 is a cross sectional view that illustrates how the scanning signal lines 16 are disconnected in a liquid crystal panel which includes this active matrix substrate. It is understandable from FIG. 23 that it is more difficult for the G-C short-circuit (short-circuit between the scanning electrode section 16a and the common electrode 28) to occur at the time of repair with this configuration. The color filter substrate has the color layers 14 (R, G, B) provided such that the color layers 14 superpose the first pixel electrodes 17a.

Figure 24:
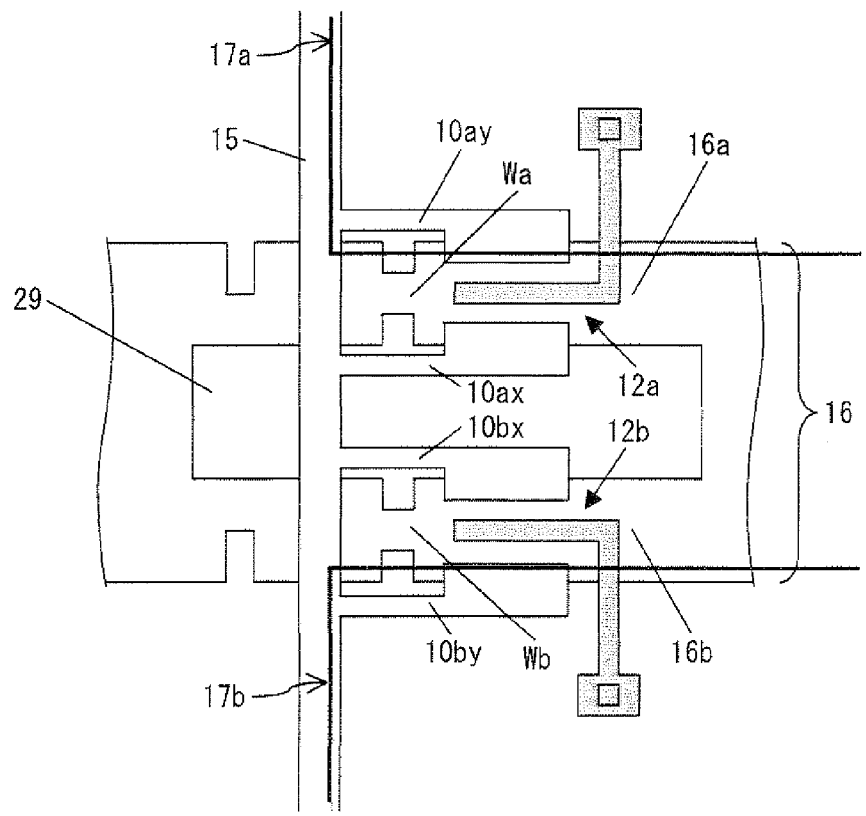
FIG. 24 is a plan view showing another configuration of the active matrix substrate according to Sixth Embodiment.

In an active matrix substrate in which a thick interlayer insulating film 26 (organic interlayer insulating film) is provided as in FIG. 22, a parasitic capacitance between the pixel electrodes and the various wires and electrodes becomes small. Accordingly, the first pixel electrode 17a and the second pixel electrode 17b may be enlarged in size as illustrated in FIG. 24 in such a manner that the first pixel electrode 17a and the second pixel electrode 17b overlap the respective data signal lines 15 and the scanning signal lines 16. As a result, a liquid crystal panel having a high aperture ratio is realized.

Figure 25:
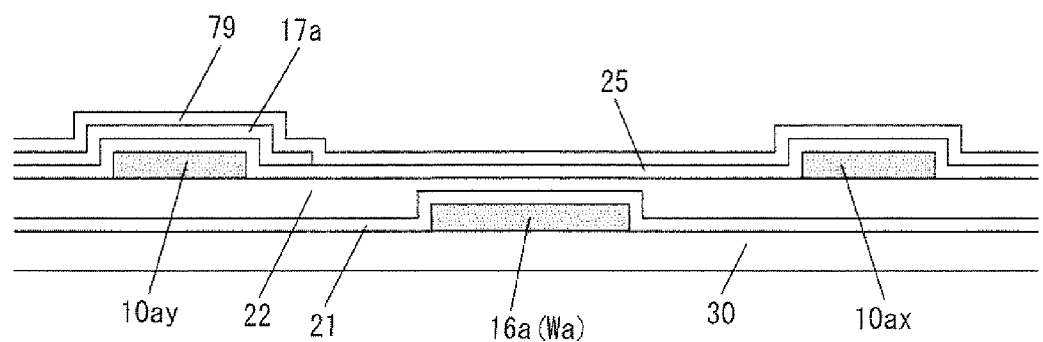
FIG. 25 is a cross sectional view showing another configuration of the active matrix substrate according to Sixth Embodiment.

The active matrix substrates illustrated in FIGS. 13 and 17 may have the gate insulating film provided above disconnection points of the scanning signal lines thicker than other parts of the gate insulating film. For example, the gate insulating film provided above the disconnection points of the scanning signal lines may have a laminated configuration including an inorganic gate insulating film and a gate insulating film (for example a flattening film made of organic insulating film or silicon-on-glass material) thicker than the inorganic gate insulating film. Such configuration compensates peeling off of metal (source metal and gate metal) at the thick interlayer insulating film in a case where source extension electrodes and scanning signal lines are disconnected by irradiating a laser to the active matrix substrate from a rear side of the liquid crystal panel after the active matrix substrate is fabricated to the liquid crystal panel. Particularly, this is effective in a configuration in which the scanning signal lines 16 are provided thick so that a resistance is reduced however the scanning signal lines 16 can still be disconnected. This reduces the possibility of a G-C short-circuit (short-circuit of scanning signal lines and common electrode of CF) at a time of repair. FIG. 25 is a cross sectional view (cross sectional view including the narrowed portions Wa and Wb of the scanning signal lines 16, and the first pixel electrode 17a) illustrating a configuration of an active matrix substrate 3b in which the gate insulating film provided above the disconnection positions of the scanning signal lines 16 has a laminated configuration including an inorganic gate insulating film and a gate insulating film thicker than the inorganic gate insulating film. As illustrated in FIG. 25, a first scanning electrode section 16a (scanning signal line 16) is provided on the substrate 30, and on the first scanning electrode section 16a, an inorganic gate insulating film 21 and a gate insulating film 22 (for example, flattening film made of SOG material) thicker than the inorganic insulating film 21 are provided. On the gate insulating film 22, source extension electrodes 10ay and 10ax are provided.

Seventh Embodiment

Figure 26:
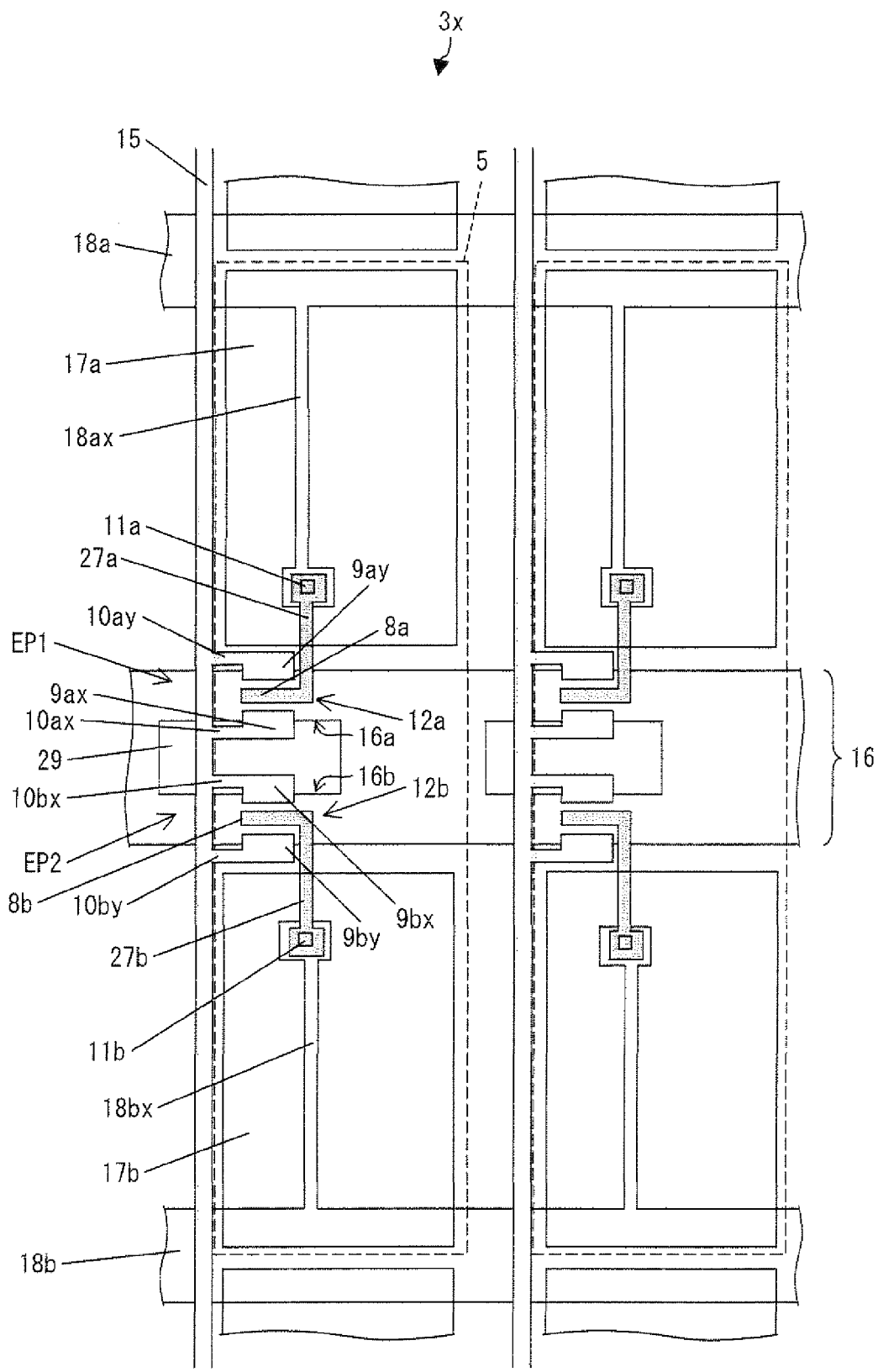
FIG. 26 is a plan view showing a configuration of an active matrix substrate according to Seventh Embodiment.
Figure 27:
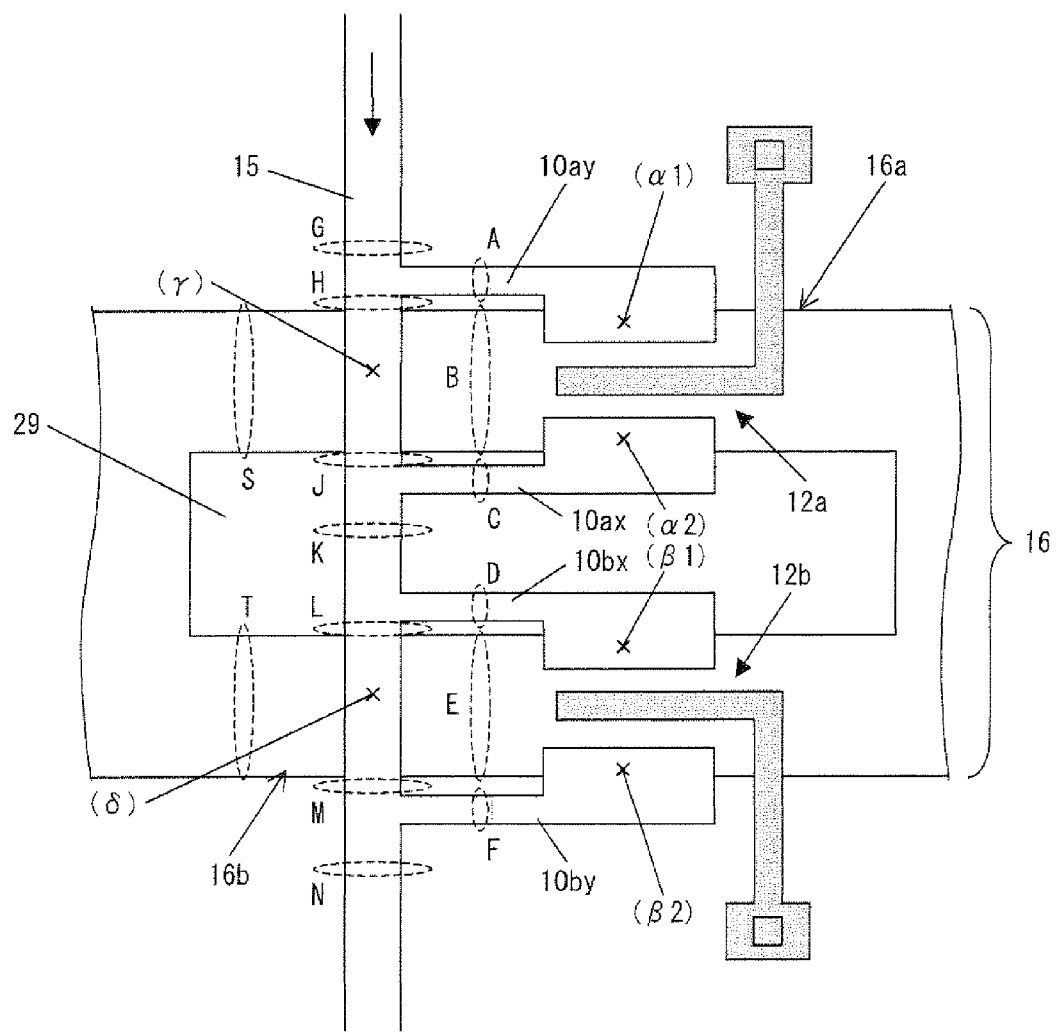
FIG. 27 is a plan view showing short-circuit points and corresponding disconnection points, in a case of repairing the active matrix substrate of FIG. 26.

In the aforementioned embodiments, the present active matrix substrate is configured such that: a narrowed portion is provided in the scanning electrode section so as facilitate disconnection of the source extension electrode; or a slit is provided on an end of the scanning electrode section so as to facilitate disconnection of the scanning electrode section. However, the present active matrix substrate is not limited to such a configuration. For example, the present active matrix substrate may be configured such that no narrowed portion or slit is provided in the scanning electrode sections. FIG. 26 shows an active matrix substrate 3x of such a configuration. FIG. 27 is an enlarged view of a vicinity of the first transistor 12a and the second transistor 12b in FIG. 26. In repairing the active matrix substrate 3x and a liquid crystal panel including the same, a suitable point of A to H, J to N, and S to T in FIG. 27 is disconnected in a suitable order in accordance with various conditions (e.g., a specific structure of an active matrix substrate or a liquid crystal panel, laser accuracy, required quality, and costs).

Points of disconnection and the order thereof are not limited to the embodiments described above, but may be appropriately altered in view of a specific structure of an active matrix substrate or a liquid crystal panel, laser accuracy, costs, and the like, as described above.

The aforementioned active matrix substrate is configured such that each retention capacitor is provided by a pixel electrode, a retention capacitor wire, and an insulating film provided therebetween. However, a configuration of the retention capacitor is not limited to this. For example, the present active matrix substrate may also be configured such that an on-retention capacitor electrode connected to the drain electrode of a transistor and to the pixel electrode is provided on the retention capacitor wire, and this on-retention capacitor electrode, the retention capacitor wire, and an insulating film provided therebetween forms the retention capacitor.

In the above explanation, an extending direction of the scanning signal lines 16 is defined as a row direction, and an extending direction of the data signal lines 15 is defined as a column direction. However, this is just for convenience in explanation. In an active matrix substrate in which the scanning signal lines 16 extend in a horizontal direction, the horizontal direction is viewed as the row direction. On the other hand, in an active matrix substrate in which the scanning signal lines 16 extend in a vertical direction, the vertical direction is viewed as the row direction. For example, for a liquid crystal display device in which a screen is rotatable by 90°, the above view can be applied to a case where a rotation angle is 0° or 90°.

In the present embodiment, the present liquid crystal display unit and the liquid crystal display device are arranged as below.

Figure 28:
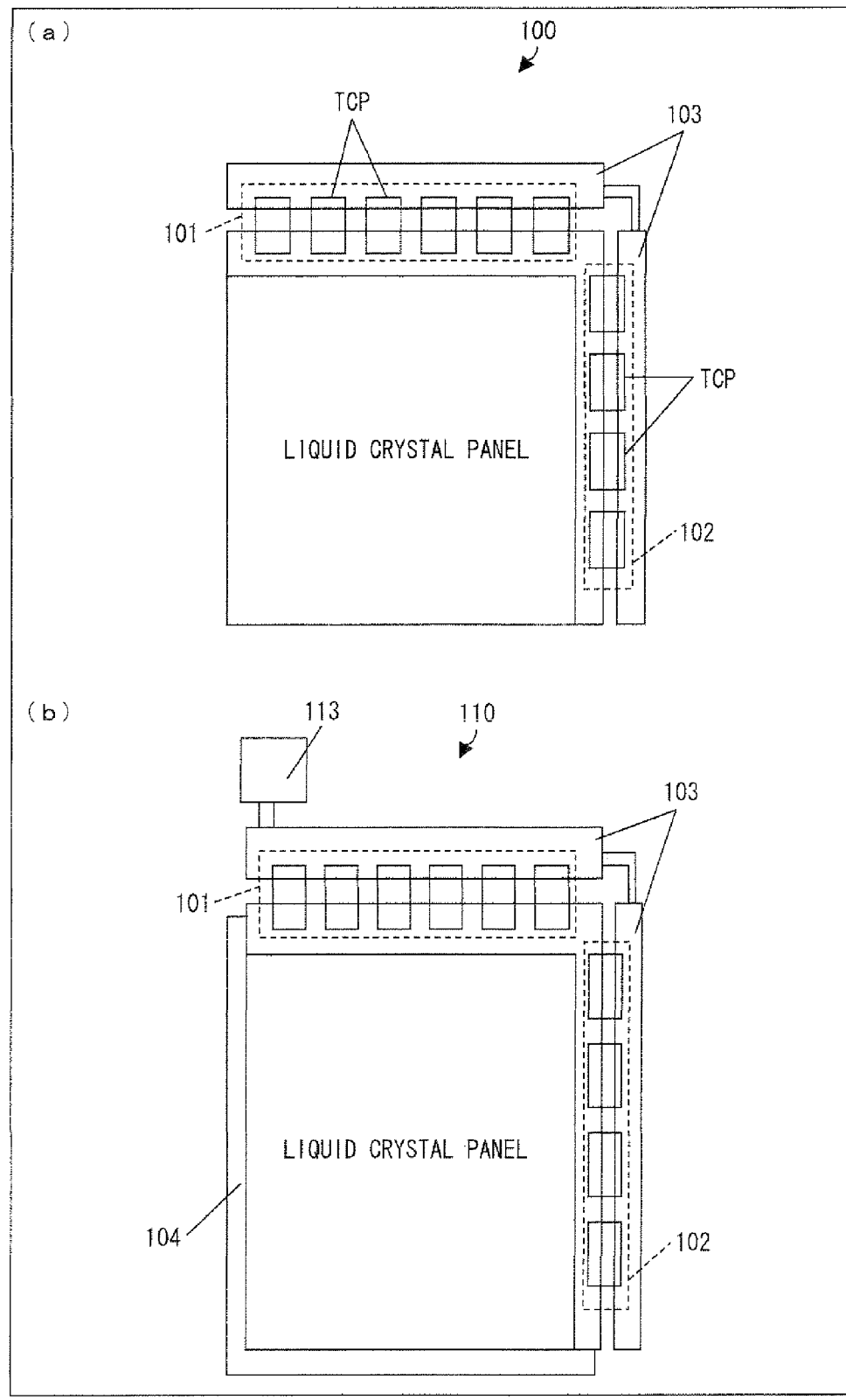
FIG. 28 (a) is a schematic view showing a configuration of a liquid crystal display unit of the present invention.
Figure 29:
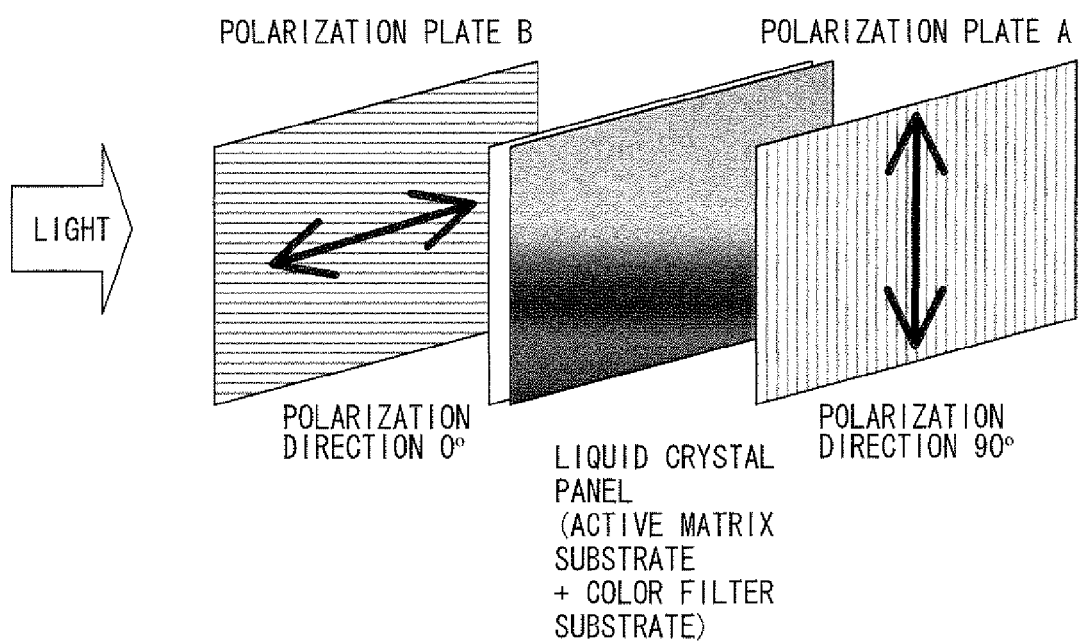
FIG. 29 is a schematic view showing how to attach polarization plates to the present liquid crystal panel.

That is, as shown in FIG. 29, to either side of a liquid crystal panel, two polarization plates A and B are combined so that polarization axes of the polarization plates A and B intersect at right angles to each other. Furthermore, an optical compensation sheet or the like may be laminated on the polarization plate if necessary. Furthermore, an optical compensation sheet or the like may be laminated on the polarization plate if necessary. Next, as shown in FIG. 28 (a), drivers (a gate driver 102 and a source driver 101) are connected. The following description explains a connection by a TCP (Tape Career Package) method as one example. First, an ACF (Anisotropic Conductive Film) is temporarily pressed on a terminal section of the liquid crystal panel. Next, a TCP in which the drivers are loaded is punched out from a carrier tape. The TCP is aligned to a panel terminal electrode, and is heated and finally pressed. Thereafter, a circuit substrate 103 (PWB: Printed wiring board) for connecting the drivers TCP together and an input terminal of the TCP are connected together with the ACF. With this, a liquid crystal display unit 100 is provided.

Thereafter, as shown in FIG. 28 (b), a display control circuit 113 is connected to the drivers (101 and 102) of the liquid crystal display unit via the circuit board 103. By integrating the liquid crystal display unit and the display control circuit 113 with an illumination device (backlight unit) 104, a liquid crystal display device 110 is provided.

Figure 30:
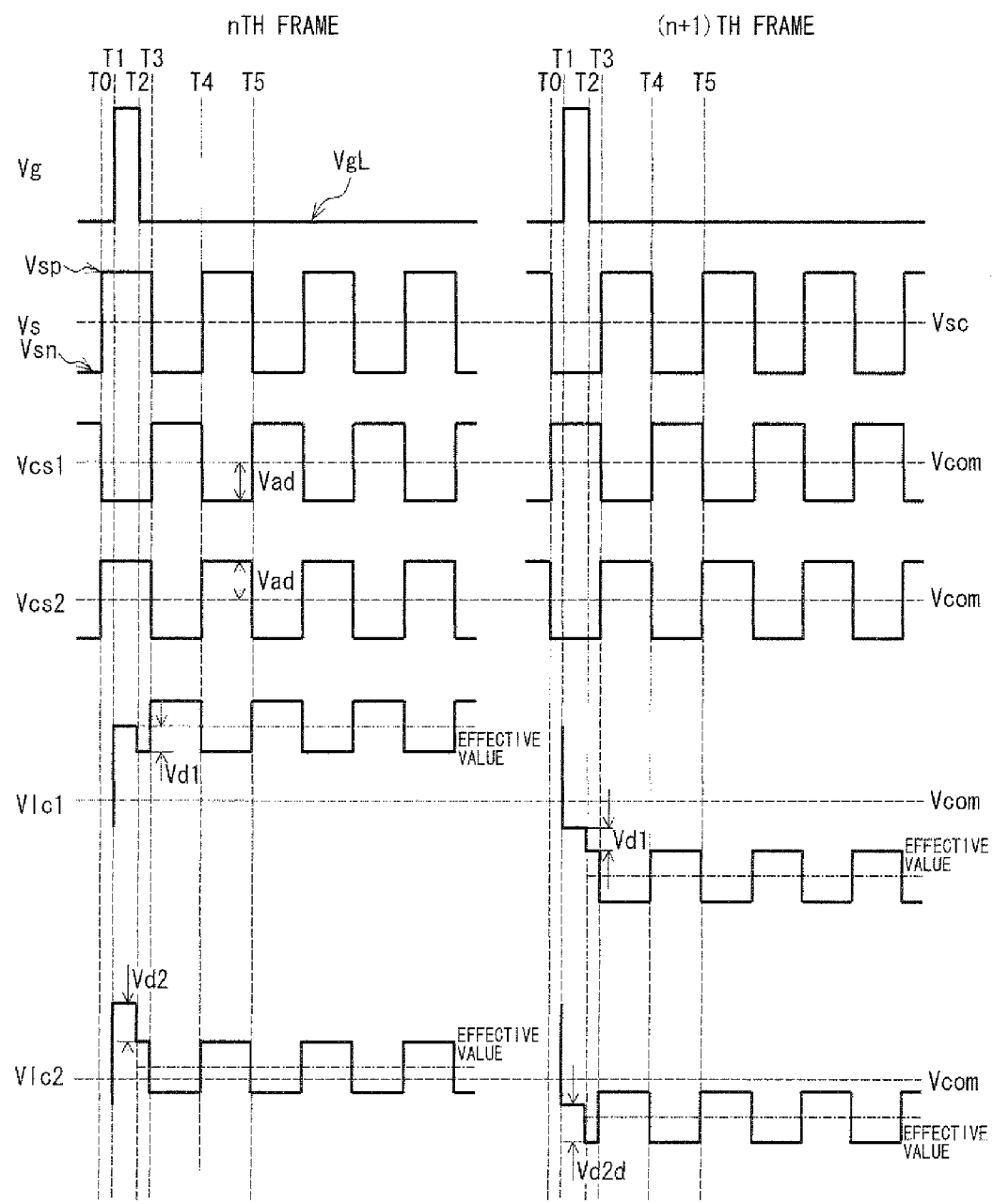
FIG. 30 is a timing chart showing a method for driving the present liquid crystal display device.

FIG. 30 is a timing chart showing operation of each section in the present liquid crystal display device. Here, Vg is a voltage of the scanning signal line 16, Vs is a voltage (source voltage) of the data signal line 15, Vcs1 is a voltage of the first retention capacity wire 18a, Vcs2 is a voltage of the second retention capacity wire 18b, Vlc1 is a voltage of a first pixel electrode 17a, and Vlc2 is a voltage of the second pixel electrode 17b. In a liquid crystal display device, an AC driving, such as a frame inversion driving, a line inversion driving, or a dot inversion driving is generally performed so that liquid crystals are not polarized. That is, a source voltage (Vsp) of a positive polarity with respect to the median Vsc of the source voltage in the nth frame is supplied, a source voltage (Vsn) of a negative polarity with respect to Vsc is supplied in the next (n+1)th frame is supplied, and further the dot inversion driving is performed for each frame. Further, the voltage of the first retention capacitor wire 18a and the second retention capacitor wire 18b are amplified with an amplitude voltage Vad, and their phases are shifted by 180°. That is, the voltages of the first retention capacitor wire 18a and the second retention capacitor wire 18b are controlled so that Vcs1 is "H" and Vcs2 is "L" immediately after Vg is "L" (the TFTs 12a and 12b are switched OFF) at T2.

Figure 31:
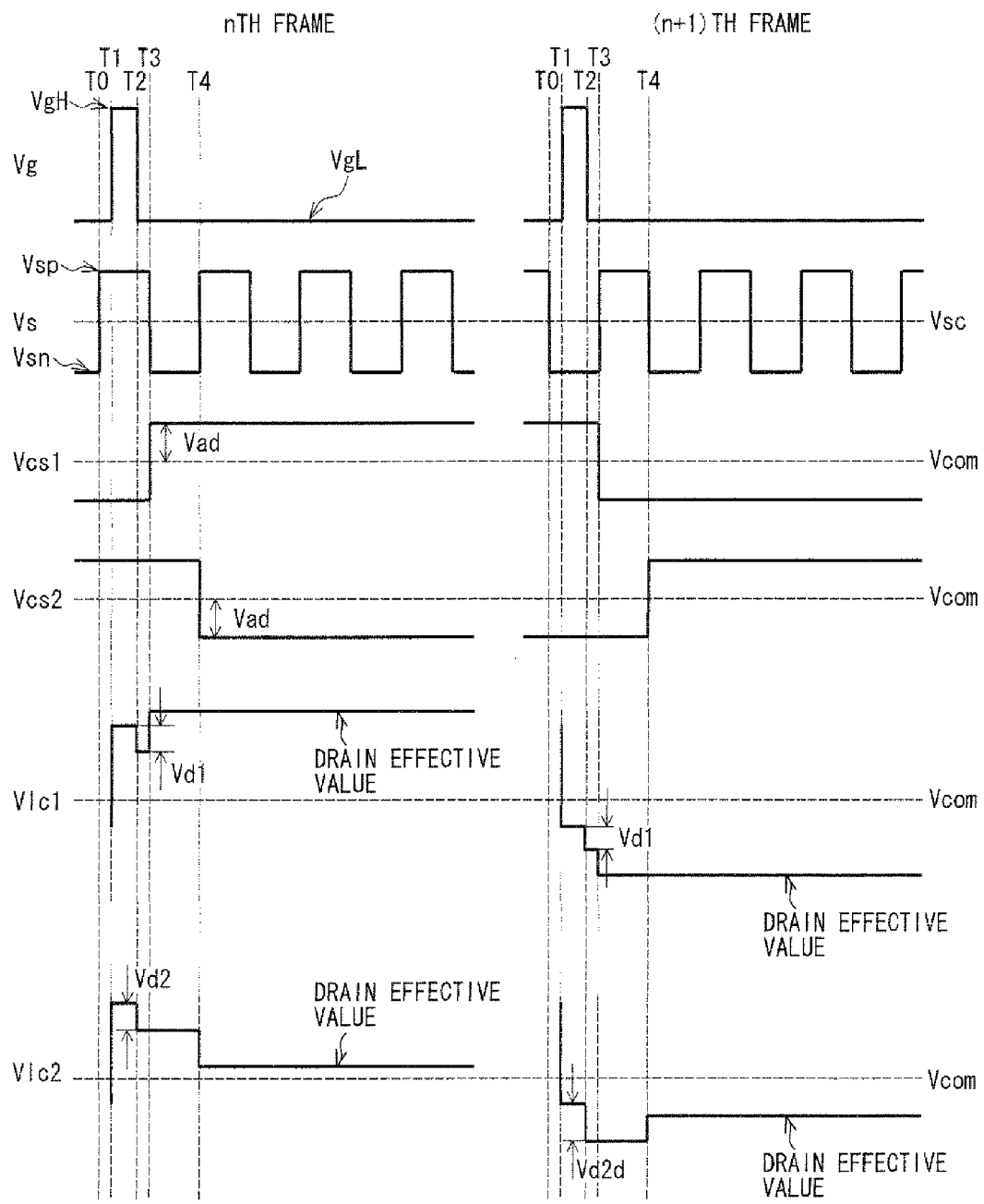
FIG. 31 is a timing chart showing another method for driving the present liquid crystal display device.

Furthermore, as shown in FIG. 31, it may be also arranged that the Vcs1 is a waveform which remains "High" (or "Low") at T3 immediately after Vg becomes "L" at T2 (the TFTs 12a and 12b are OFF) and the Vcs2 is a waveform which remains "Low" (or "High") at T4 followed by one horizontal period (1H) from T3. That is, potentials are controlled in such a manner that: Vcs1 is suddenly increased after each transistor is switched OFF and the sudden rise state is maintained in the frame, and Vcs2 is suddenly decreased after 1H period from the sudden rise of Vcs1 and the sudden fall state is maintained in the frame; or the Vcs1 is suddenly decreased after each transistor is switched OFF and the sudden fall state is maintained in the frame, and the Vcs2 is suddenly increased after 1H period from the sudden fall of Vcs1 and the sudden rise state is maintained in the frame. Thus, waveform distortion of the Vcs1 and Vcs2 have less influence on drain effective potential, thereby being effective in reducing uneven luminance.

Figure 32:
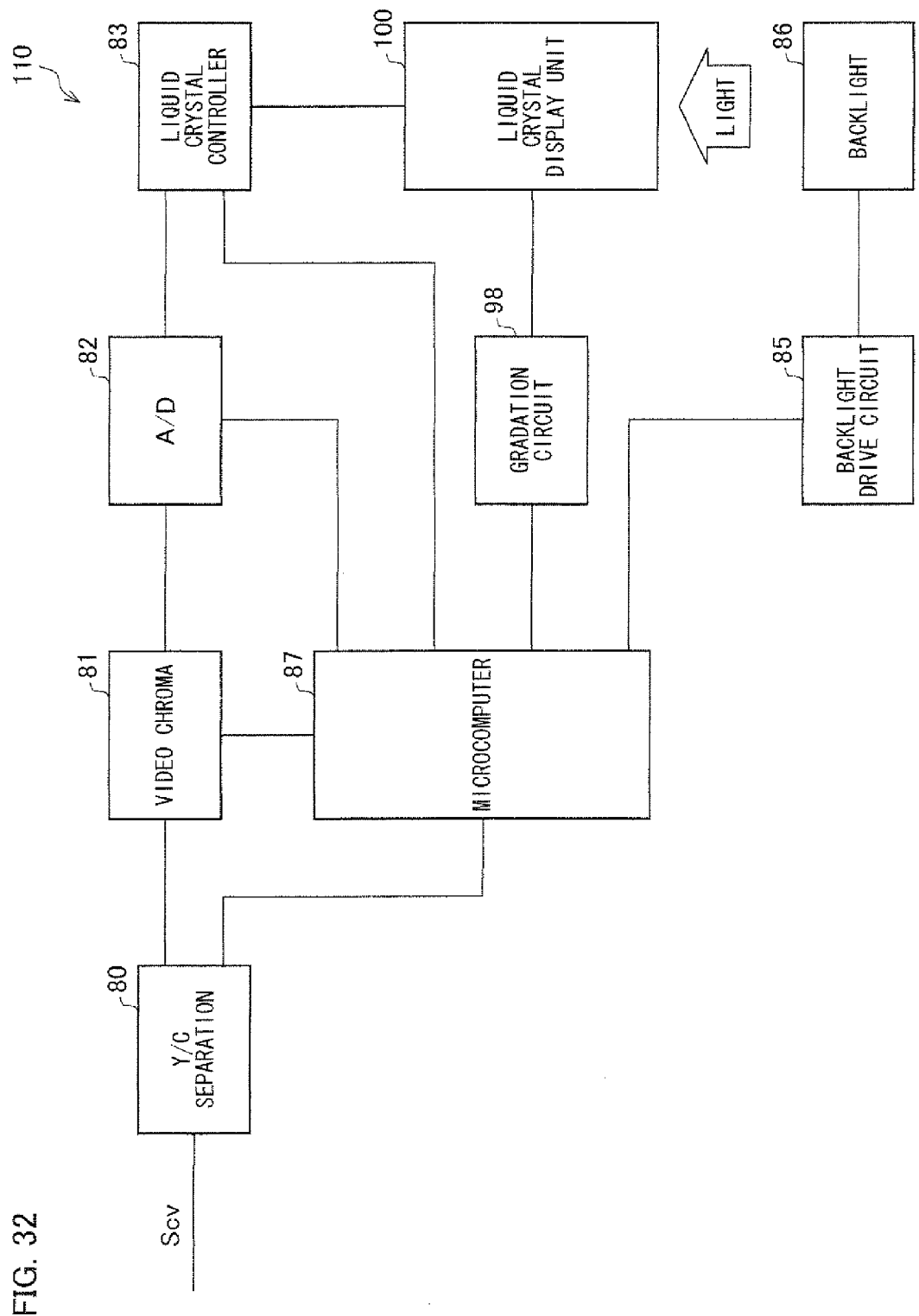
FIG. 32 is a block diagram showing the operation of the present liquid crystal display device.

Next, the following explains one example of configuration of the present liquid crystal display device in applying the liquid crystal display device to a television receiver. FIG. 32 is a block diagram showing a configuration of a liquid crystal display device 110 for a television receiver. The liquid crystal display device 110 includes a liquid crystal display unit 100, a Y/C separation circuit 80, a video chroma circuit 81, an A/D converter 82, a liquid crystal controller 83, a backlight drive circuit 85, a backlight 86, a microcomputer 87, and a gradation circuit 98.

The liquid crystal display unit 100 includes a liquid crystal panel described in the aforementioned embodiments, and source and gate drivers for driving the liquid crystal panel.

In the liquid crystal display 110 of the aforementioned configuration, a complex color video signal Scv as a television signal is inputted from the outside to the Y/C separation circuit 80. In the Y/C separation circuit 80, the complex color video signal Scv is separated into a luminance signal and a color signal. The luminance signal and the color signal are converted to an analog RGB signal corresponding to three fundamental colors of light in the video chroma circuit 81. Further, the analog RGB signal is converted to a digital RGB signal by the A/D converter 82. The digital RGB signal is inputted to the liquid crystal controller 83. Moreover, in the Y/C separation circuit 80, horizontal and vertical sync signals are extracted from the complex color video signal Scv inputted from the outside. These sync signals are also inputted to the liquid crystal controller 83 via the microcomputer 87.

The digital RGB signal is inputted to the liquid crystal display unit 100 from the liquid crystal controller 83 with a timing signal in accordance with the aforementioned sync signals at a predetermined timing. Furthermore, in the gradation circuit 98, gradation voltages of three fundamental colors R, G, and B of color display are generated, and these gradation voltages are also supplied to the liquid crystal display unit 100. In the liquid crystal display unit 100, drive signals (e.g., data signals and scanning signals) are generated by the source and gate drivers or the like inside the liquid crystal display unit 100 in accordance with the RGB signal, the timing signal, and the gradation voltages. A color image is displayed on a display section inside the liquid crystal display unit 100 in accordance with the drive signals. For displaying an image by the liquid crystal display unit 100, light needs to be irradiated from a rear of the liquid crystal display unit 100. In the liquid crystal display device 110, the backlight drive circuit 85 drives the backlight 86 under control by the microcomputer 87 and thereby light is irradiated on a back side of the present liquid crystal panel.

Control of the whole system, including the aforementioned processes is carried out by the microcomputer 87. As the video signal (complex color video signal) inputted from the outside, not only a video signal in accordance with television broadcast but also a video signal picked up by a camera or supplied via the Internet line is also usable. In the liquid crystal display device 110, image display in accordance with various video signals can be performed.

Figure 33:
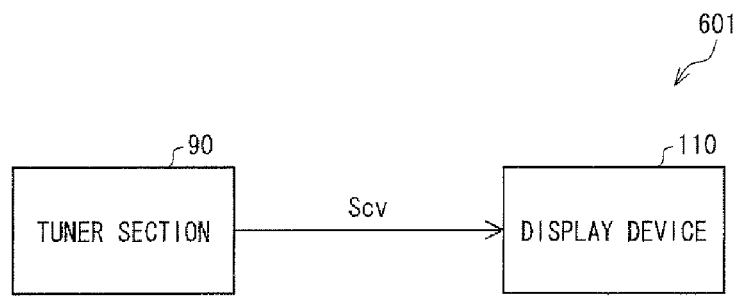
FIG. 33 is a block diagram showing the operation of a television receiver of the present invention.

In displaying an image by the liquid crystal display device 110 in accordance with television broadcast, a tuner section 90 is connected to the liquid crystal display device 110, as shown in FIG. 33. With this, a television receiver 601 of the present invention is configured. The tuner section 90 extracts a channel signal to be received from receiving waves (high-frequency signals) by an antenna (not illustrated), and converts the channel signal to an intermediate frequency signal. The tuner section 90 detects the intermediate frequency signal, thereby extracting the complex color video signal Scv as the television signal. The complex color video signal Scv is inputted to the liquid crystal display device 110 as described above and an image is displayed by the liquid crystal display device 110 in accordance with the complex color video signal Scv.

Figure 34:
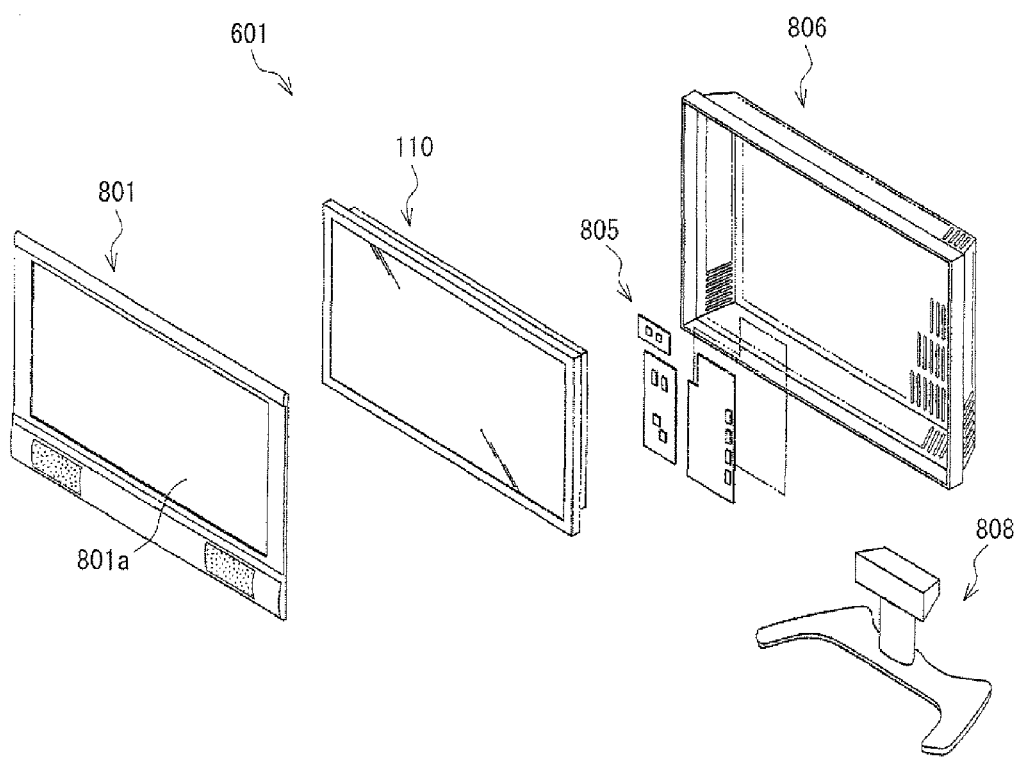
FIG. 34 is an exploded perspective view showing a configuration of the present television receiver.
Figure 35:
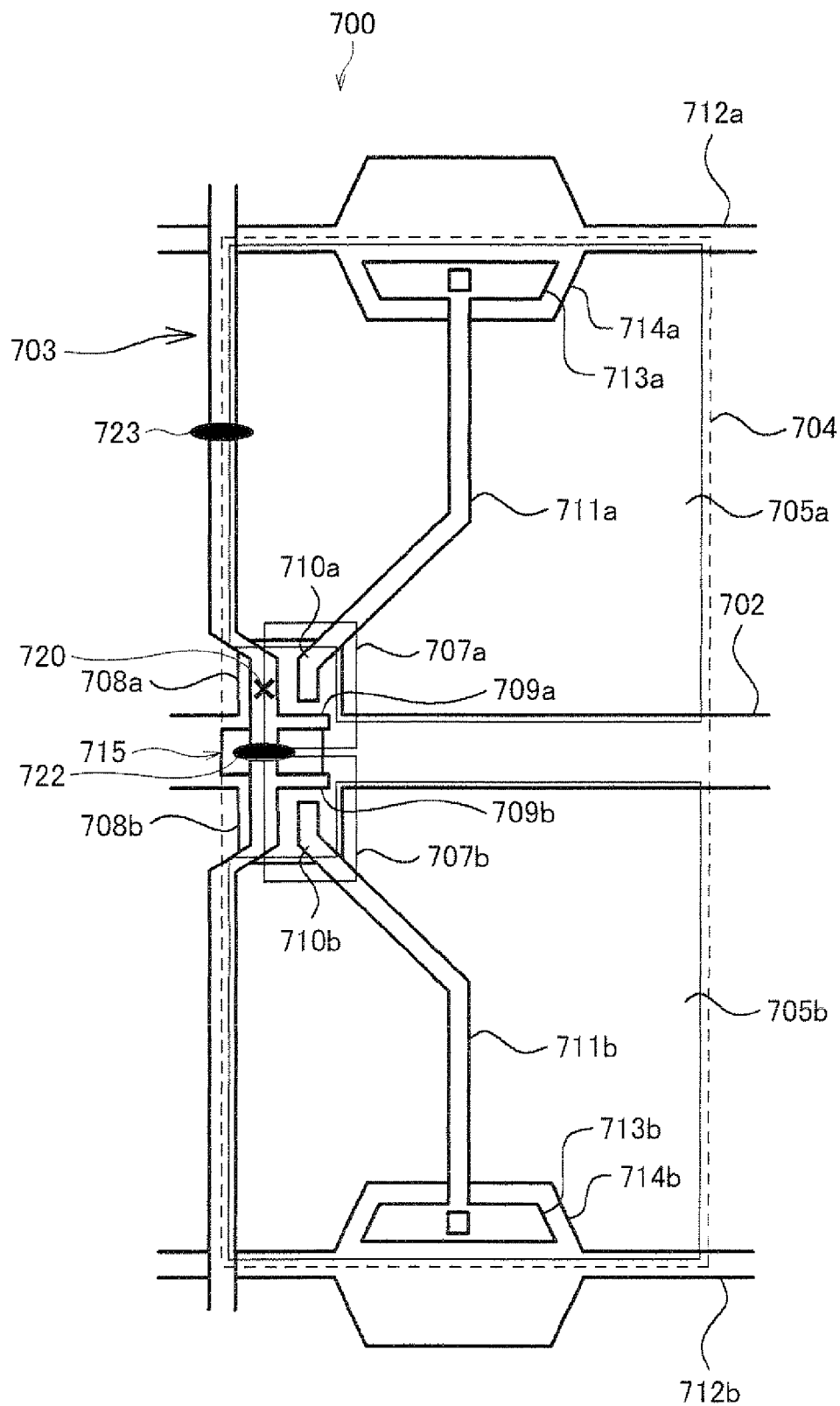
FIG. 35 is a plan view showing a configuration of a conventional active matrix substrate and a method for repairing the same.

FIG. 34 is an exploded perspective view showing one example of configuration of the present television receiver. As shown in the drawing, the present television receiver 601 includes, as constituent features thereof, a first housing 801 and a second housing 806 in addition to the liquid crystal display device 110. The liquid crystal display device 110 is arranged such that the first housing 801 and the second housing 806 hold the liquid crystal display 110 so as to wrap therein the liquid crystal display 110. The first housing 801 has an opening 801a for transmitting an image displayed on a display device 800. On the other hand, the second housing 806 covers a back side of the display device 800. The second housing 806 is provided with an operating circuit 805 for operating the display device 800. The second housing 806 is further provided with a supporting member 808 therebelow.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

A liquid crystal panel and a liquid crystal display device of the present invention are suitable for a liquid crystal television, for example.

The invention claimed is:
1. An active matrix substrate comprising:
scanning signal lines extending in a row direction;
data signal lines extending in a column direction;
first transistors and second transistors, each pair of which is provided in a vicinity of corresponding intersections of the scanning signal lines and the data signal lines respectively, the first transistors and the second transistors being connected to the data signal lines corresponding thereto and having gate electrodes which are the scanning signal lines corresponding thereto, and
pixel regions,
each of the pixel regions including:
a first pixel electrode connected to corresponding one of the first transistors; and
a second pixel electrode connected to corresponding one of the second transistors,
the scanning signal lines each having an opening, a first scanning electrode section, and a second scanning electrode section in the vicinity of each intersection, the first scanning electrode section and a second scanning electrode section being provided on respective adjacent sides to the opening in such a manner that the first scanning electrode section and second scanning electrode section face each other and sandwich therebetween the opening in a column direction, each of the first transistors including (i) a drain electrode provided above the first scanning electrode section corresponding thereto and (ii) two source electrodes provided such that the drain electrode is sandwiched between the two source electrodes, one of the source electrodes being connected to the data signal line corresponding thereto, via a source extension electrode provided above the opening corresponding thereto, and the other one of source electrodes being connected to the data signal line corresponding thereto, via a source extension electrode provided off the scanning signal line corresponding thereto, and each of the second transistors including (i) a drain electrode provided above the second scanning electrode section corresponding thereto and (ii) two source electrodes provided such that the drain electrode is sandwiched between the two source electrodes, one of the source electrodes being connected to the data signal line corresponding thereto, via a source extension electrode provided above the opening corresponding thereto, and the other one of the source electrodes being connected to the data signal line corresponding thereto, via a source extension electrode provided off the scanning signal line corresponding thereto.

2. The active matrix substrate according to claim 1, wherein:

the first scanning electrode section has a narrowed portion at least a part of a portion located below a gap between (i) the source extension electrode connected to one of the two source electrodes of the first transistor and (ii) the source extension electrode connected to the other source electrode of the first transistor, the narrowed portion being narrowed in width and the second scanning electrode section has a narrowed portion at least a part of a portion located below a gap between (i) the source extension electrode connected to one of the two source electrodes of the second transistor and (ii) the source extension electrode connected to the other source electrode of the second transistor.

3. The active matrix substrate according to claim 2, comprising:

an inorganic gate insulating film and a gate insulating film thicker than the inorganic gate insulating film are provided above the narrowed portion of the first scanning electrode section and above the narrowed portion of the second scanning electrode section.

4. The active matrix substrate according to claim 1, wherein the source extension electrodes have a width in its row direction greater than that in its column direction.

5. The active matrix substrate according to claim 1, wherein each of the openings extends from outside the pixel region corresponding thereto, to inside the pixel region, each of the openings extending so as to cross under the respective data signal line.

6. The active matrix substrate according to claim 5, wherein:

the first scanning electrode section has two ends in a row direction, one end of the first scanning electrode section provided outside the respective pixel region being a first end, the first end having a slit, and the second scanning electrode section has two ends in a row direction, one end of the second scanning electrode section provided outside the respective pixel region being a second end, the second end having a slit.

7. The active matrix substrate according to claim 1, wherein the openings are shaped to extend in a row direction.

8. The active matrix substrate according to claim 1, further comprising:

subwires extended along the data signal lines, the subwires being electrically connected to the data signal lines respectively and passing over the openings corresponding thereto.

9. The active matrix substrate according to claim 8, wherein the subwires are connected to the respective data signal lines above the openings corresponding thereto.

10. The active matrix substrate according to claim 1, further comprising:

bypass wires provided to the respective data signal lines in such a manner that each of the bypass wires bypasses an intersection of the data signal line corresponding thereto and passes over the openings corresponding thereto.

11. The active matrix substrate according to claim 10, wherein the bypass wires and the respective data signal lines are connected above the openings corresponding thereto respectively.

12. The active matrix substrate according to claim 1, comprising:

an inorganic interlayer insulating film and an organic interlayer insulating film provided above the first transistors and the second transistors, the organic interlayer insulating film being thicker than the inorganic interlayer insulating film.

13. A liquid crystal panel comprising an active matrix substrate as set forth in claim 1.

14. The liquid crystal panel according to claim 13, wherein a black matrix, provided to a substrate that faces the active matrix substrate, overlaps the openings.

15. A liquid crystal display unit comprising:
a liquid crystal panel as set forth in claim 13; and
a driver of the liquid crystal panel.

16. A liquid crystal display device comprising:
a liquid crystal display unit as set forth in claim 15; and
an illumination device.

17. A television receiver comprising:
a liquid crystal display device as set forth in claim 16; and
a tuner for receiving television broadcast.

* * * * *